United States Patent [19]
Kutsumi

[11] Patent Number: 5,826,219
[45] Date of Patent: Oct. 20, 1998

[54] MACHINE TRANSLATION APPARATUS

[75] Inventor: Takeshi Kutsumi, Yamatokoriyama, Japan

[73] Assignee: Sharp Kabushiki kaisha, Osaka, Japan

[21] Appl. No.: 584,361

[22] Filed: Jan. 11, 1996

[30] Foreign Application Priority Data

Jan. 12, 1995 [JP] Japan .................................. 7-003522

[51] Int. Cl.⁶ .................................................. G06F 17/28
[52] U.S. Cl. .................................................. 704/4; 704/2
[58] Field of Search .................................. 395/754, 755, 395/756, 751–752; 704/1.2, 4, 5, 9; 707/530–536

[56] References Cited

U.S. PATENT DOCUMENTS

| | | | |
|---|---|---|---|
| 4,774,666 | 9/1988 | Miya et al. | 395/753 |
| 4,866,670 | 9/1989 | Adachi et al. | 395/755 |
| 4,964,044 | 10/1990 | Kumano et al. | 395/756 |
| 5,001,633 | 3/1991 | Fukumochi et al. | 395/756 |
| 5,005,127 | 4/1991 | Kugimiya et al. | 395/755 |
| 5,091,876 | 2/1992 | Kumano et al. | 395/753 |
| 5,351,189 | 9/1994 | Doi et al. | 395/753 |

FOREIGN PATENT DOCUMENTS 64-78373  3/1989  Japan .

*Primary Examiner*—Frantzy Poinvil

[57] ABSTRACT

A machine translation apparatus for translating a source language sentence into a target language sentence according to the present invention includes: an analysis unit for analyzing the source language sentence and generating a syntax tree of the source language; a conversion unit for converting the syntax tree of the source language into a syntax tree of the target language; and a generation unit for generating the target language sentence based on the syntax tree of the target language. The machine translation apparatus further includes: a correspondence information storage unit for storing information of correspondence between words in the source language sentence and words in the target language sentence obtained by the generation unit; a positioning unit for determining division positions at which to divide the source language sentence into phrases in the source language based on phrase categories in the syntax tree of the source language generated by the analysis unit; a translated phrase building unit for dividing the source language sentence at the division positions and generating phrases in the target language corresponding to the phrases in the source language; an output formatting unit for generating an output format for displaying the phrases in the source language so that the phrases in the source language correspond to the phrases in the target language; and a display unit for outputting the phrases in the source language and the phrases in the target language onto a display screen.

15 Claims, 26 Drawing Sheets

FIG. 4

Original text buffer 7a

| Word position | Word |
|---|---|
| 1 | In |
| 2 | addition |
| 3 | to |
| 4 | sequential |
| 5 | files, |
| 6 | the |
| 7 | second |
| 8 | file |
| 9 | structure |
| 10 | used |
| 11 | by |
| 12 | SHARP-BASIC |
| 13 | is |
| 14 | random |
| 15 | access. |

FIG.5 (for syntax before conversion)
Buffer 7c

Buffer 7d (for syntax after conversion)

FIG. 7

Translated word buffer 7e

| Word position | Word |
|---|---|
| 1 | Chikujifairu |
| 2 | nikuwaete |
| 3 | |
| 4 | sharp – BASIC |
| 5 | niyotte |
| 6 | tsukawareru |
| 7 | dai2no |
| 8 | fairu |
| 9 | kozo |
| 10 | ha |
| 11 | |
| 12 | randamuakusesu |
| 13 | dearu |
| 14 | 。 |

FIG.8

Original word-translated word correspondence information buffer 7f

| Original word position | Corresponding translated word position |
|---|---|
| 1 | 2 |
| 2 | 2 |
| 3 | 2 |
| 4 | 1 |
| 5 | 1 |
| 6 | |
| 7 | 7 |
| 8 | 8 |
| 9 | 9 |
| 10 | 6 |
| 11 | 5 |
| 12 | 4 |
| 13 | 13 |
| 14 | 12 |
| 15 | 12 |

FIG. 9

Division rules

| Sequential No. | Rule |
|---|---|
| 1 | A division must be made between nodes which are immediately under a "sentence" node |
| 2 | Portions combined by a "main clause" node must be separated |
| 3 | Portions combined by a "subordinate clause" node must be separated |
| 4 | Portions combined by a "THAT clause" node must be separated |
| 5 | Portions combined by a "participle structure phrase" node must be separated |
| 6 | Portions combined by a "subject" node must be separated |
| 7 | Portions combined by an "arbitrary case" node must be separated |
| 8 | Portions combined by a "present participle phrase" node must be separated |
| 9 | Portions combined by a "past participle phrase" node must be separated |

Buffer 7c (for syntax before conversion)

FIG.11

Division position buffer 7g

| Sequential No. | Word position |
|---|---|
| 1 | 1 |
| 2 | 6 |
| 3 | 10 |
| 4 | 13 |

FIG.12

Translated word position buffer 7h
(directed to each phrase)

| Phrase No. | Translated word position | | | |
|---|---|---|---|---|
| 1 | 1 | 2 | | |
| 2 | 7 | 8 | 9 | 10 |
| 3 | 4 | 5 | 6 | |
| 4 | 12 | 13 | | |

FIG.13

Translated phase buffer 7i

| Phrase No. | Translated phrase |
|---|---|
| 1 | Chikujifairunikuwaete |
| 2 | dai2nofairuha |
| 3 | sharp-BASIC niyottetsukawareru |
| 4 | randamuakusesudearu |

FIG.14

In addition to sequential files,　　the second file structure
逐次ファイルに加えて　　　　　　第2のファイル構造は used by SHARP−BASIC　　　is random access.
シャープ−BASICによって使われる　ランダムアクセスである

FIG.15

Division rules grouped into different levels

| Sequential No. | Rule | Division level |
|---|---|---|
| 1 | A division must be made between nodes which are immediately under a "sentence" node | 1 |
| 2 | Portions combined by a "main clause" node must be separated | 1 |
| 3 | Portions combined by a "subordinate clause" node must be separated | 1 |
| 4 | Portions combined by a "THAT clause" node must be separated | 1 |
| 5 | Portions combined by a "participle structure phrase" node must be separated | 2 |
| 6 | Portions combined by a "subject" node must be separated | 2 |
| 7 | Portions combined by an "arbitrary case" node must be separated | 2 |
| 8 | Portions combined by a "present participle phrase" node must be separated | 2 |
| 9 | Portions combined by a "past participle phrase" node must be separated | 2 |
| 10 | Portions combined by an "infinitive phrase" node must be separated | 3 |
| 11 | Portions combined by a "gerund phrase" node must be separated | 3 |
| 12 | A division must be made between nodes which are immediately under a "... clause" node | 3 |
| 13 | A division must be made between nodes which are immediately under a "... participle phrase" node | 3 |
| 14 | A division must be made between nodes which are immediately under a "participle structure phrase" node | 3 |
| 15 | A division must be made between nodes which are immediately under an "infinitive phrase" node | 3 |
| 16 | A division must be made between nodes which are immediately under a "gerund phrase" node | 3 |
| 17 | A division must be made between nodes which interpose an "co-ordinate conjunctive" node | 3 |

Buffer 7c (for syntax before conversion)

FIG.17

In addition to sequential files, the second file structure
逐次ファイルに加えて　　　　　シャープ-BASICによって使 used by SHARP-BASIC is random access.
われる第2のファイル構造はランダムアクセスである

Buffer 7c (for syntax before conversion)

FIG.19

In addition to sequential files, the second file structure
逐次ファイルに加えて　　　　　　第2のファイル構造は used　　by SHARP–BASIC　is　random access.
使われるシャープ–BASICによって　である　ランダムアクセス

FIG. 21

" ~ " generation rule

| Sequential No. | Rule |
|---|---|
| 1 | When portions combined by a "THAT clause" node have been separated, add " ~ " to translation of a phrase immediately before the portions combined by the "THAT clause" in original language |

FIG.23

Division position buffer 7g

| Sequential No. | Word position | Generation of omission symbol " ~ " |
|---|---|---|
| 1 | 1 | Yes |
| 2 | 4 | |

FIG. 24

The reason is that we want these numbers to be rounded off.
理由は～である　我々がこれらの数が四捨五入されることを望むこと

FIG. 25

In addition to sequential files,　the second file structure
逐次ファイルに加えて　　　　　第2のファイル構造は used by SHARP-BASIC　is random access.
シャープ-BASICによって使われる　ランダムアクセスである

FIG.27

```
⟨Original⟩                      : ⟨Translated⟩
In addtion to sequential files, the  · 逐次ファイルに加えて 第2のファイル構造は
second file structure used by      · シャープ-BASICによって使われる ランダ
SHARP-BASIC is random access.  · ムアクセスである
```

FIG.28

```
⟨Original⟩                      : ⟨Translated⟩
In addtion to sequential files, the  · 逐次ファイルに加えて 第2のファイル構造は
second file structure used by      · シャープ-BASICによって使われる ランダ
SHARP-BASIC is random access.  · ムアクセスである
```

MACHINE TRANSLATION APPARATUS

BACKGROUND OF THE INVENTION

1. Field of the Invention

The present invention relates to a machine translation apparatus, and in particular to a machine translation apparatus capable of outputting a translated sentence in which sentences and phrases of a target language are presented as if annexed to the corresponding sentences and phrases of a source language.

2. Description of the Background Art

A number of currently available machine translation apparatuses perform translation in a sentence-by-sentence manner. However, in the state of the art, a longer sentence is more likely to have its syntax wrongly analyzed by such machine translation apparatuses. Therefore, when a text containing long sentences is translated sentence by sentence, the resultant translation often makes no sense.

A majority of current machine translation apparatuses are designed so that a user is expected to edit the output text before actually utilizing it (hereinafter, the term "output text" will be used synonymously with "translation result"). In order to facilitate this so-called post-edition process, machine translation apparatuses have been devised which output translation results in units which are smaller than sentences, e.g., word by word, phrase by phrase, or clause by clause. The concept behind this is that, when a user post-edits an output text, it would be easier for the user to edit a phrase-by-phrase output text containing few analytical errors within each phrase than to edit a sentence-by-sentence output text which is likely to contain wrong syntactic analysis.

For example, a machine translation apparatus based on a technique described in Japanese Laid-Open Patent Publication No. 64-78373 performs syntactic analysis by first building a syntactic structure in a phrase-by-phrase manner using grammar rules specially designed for phrases, and thereafter building a syntactic structure in a sentence-by-sentence manner using grammar rules for sentences. If a syntactic structure was successfully built in a sentence-by-sentence manner, a translation is generated in a sentence-by-sentence manner by using generation rules specially designed for sentences. If the apparatus fails to build a syntactic structure in a sentence-by-sentence manner, a translation is generated in a phrase-by-phrase manner by using generation rules specially designed for phrases only. In another example described in the same literature, a user is allowed to select whether to generate an output text in a phrase-by-phrase manner or in a sentence-by-sentence manner.

In the case of a machine translation apparatus based on a technique described in the above literature, the grammar rules and generation rules are categorized into a group of rules intended for phrase-by-phrase processes and a group of rules intended for sentence-by-sentence processes. This requires the designers for grammar rules, etc., to create a complicated system of grammar rules, etc.

SUMMARY OF THE INVENTION

A machine translation apparatus for translating a source language sentence into a target language sentence according to the present invention includes: an analysis unit for analyzing the source language sentence and generating a syntax tree of the source language; a conversion unit for converting the syntax tree of the source language into a syntax tree of the target language; and a generation unit for generating the target language sentence based on the syntax tree of the target language, wherein the machine translation apparatus further includes: a correspondence information storage unit for storing information of correspondence between words in the source language sentence and words in the target language sentence obtained by the generation unit; a positioning unit for determining division positions at which to divide the source language sentence into phrases in the source language based on phrase categories in the syntax tree of the source language generated by the analysis unit; a translated phrase building unit for dividing the source language sentence at the division positions and generating phrases in the target language corresponding to the phrases in the source language; an output formatting unit for generating an output format for displaying the phrases in the source language so that the phrases in the source language correspond to the phrases in the target language; and a display unit for outputting the phrases in the source language and the phrases in the target language onto a display screen.

In one embodiment of the invention, the machine translation apparatus further includes a unit for setting a division level for determining general lengths of the phrases in the source language, wherein the positioning unit determines the division positions at which to divide the source language sentence into the phrases in accordance with the division level.

In another embodiment of the invention, the division positioning unit includes a division position storage unit for storing information as to whether or not to generate an auxiliary symbol in cases where a division is made in the source language sentence between a phrase and another phrase to which the said phrase refers to, and the translated phrase building unit inserts the auxiliary symbol into a phrase in the target language in accordance with the information stored in the division position storage unit.

In still another embodiment of the invention, the division positioning unit includes a division position storage unit for storing information as to whether or not to generate an auxiliary symbol in cases where a division is made in the source language sentence between a phrase and another phrase to which the said phrase refers to, and the translated phrase building phrase inserts the auxiliary symbol into a phrase in the target language in accordance with the information stored in the division position storage unit.

In still another embodiment of the invention, the output formatting unit includes: a phrase beginning position determination unit for determining a beginning position of a phrase in the source language on the display screen; a phrase length acquisition unit for determining the lengths of the said phrase in the source language and the corresponding phrase in the target language on the display screen; and a phrase end position acquisition unit for determining an end position of the said corresponding phrase in the target language on the display screen.

In still another embodiment of the invention, the output formatting unit includes: a phrase beginning position determination unit for determining a beginning position of a phrase in the source language on the display screen; a phrase length acquisition unit for determining the lengths of the said phrase in the source language and the corresponding phrase in the target language on the display screen; and a phrase end position acquisition unit for determining an end position of the said corresponding phrase in the target language on the display screen.

In still another embodiment of the invention, the machine translation apparatus further includes a border display unit which does not incorporate any highlighting at borders between adjacent phrases when displaying the phrases in the source language on the display screen.

In still another embodiment of the invention, the machine translation apparatus further includes a border display unit which does not incorporate any highlighting at borders between adjacent phrases when displaying the phrases in the source language on the display screen.

In still another embodiment of the invention, the machine translation apparatus further includes a border display unit which does not incorporate any highlighting at borders between adjacent phrases when displaying the phrases in the source language on the display screen.

In still another embodiment of the invention, the machine translation apparatus further includes a border display unit which does not incorporate any highlighting at borders between adjacent phrases when displaying the phrases in the source language on the display screen.

In still another embodiment of the invention, the machine translation apparatus further includes: a position locating unit by which a user locates the said phrase in the source language on the display screen; and a highlighting unit for displaying the phrase in the source language located by the position locating unit and the corresponding phrase in the target language with a highlighting effect on the display screen so as to be distinguishable from the other phrases.

In still another embodiment of the invention, the machine translation apparatus further includes: a position locating unit by which a user locates the said phrase in the source language on the display screen; and a highlighting unit for displaying the phrase in the source language located by the position locating unit and the corresponding phrase in the target language with a highlighting effect on the display screen so as to be distinguishable from the other phrases.

The machine translation apparatus according to the present invention subjects sentences of a source language, which is input via an input unit, to a morphological element analysis, and then subjects the source language sentences to a syntax analysis and a syntax conversion in a sentence-by-sentence manner as in the case of a number of conventional machine translation apparatuses. Then, the machine translation apparatus obtains a group of words constituting a translated sentence for one source language sentence by means of a target language generation unit, and the group of words are stored in a translated word buffer. At the same time, information of correspondence between source language words and target language words is obtained from the target language generation unit, and is stored in an original word-translated word correspondence information buffer.

Next, the result of syntax analysis is subjected to a process using a division positioning unit and phrase division rule data in order to determine phrases in the original sentence. In a translated phrase building unit, translated words corresponding to the original words constituting each phrase are obtained by referring to the original word-translated word correspondence information buffer and the translated word buffer. Then, by using the translated phrase building unit, each translated phrase is built from the translated words thus obtained. The translated phrase building unit does not require any particular rules designed for this process; in principle, the order which would be obtained in the case of sentence-by-sentence translation is conserved, and the translated words are arranged for each phrase.

Moreover, a user can select one of a plurality of phrase division rules for use in the above phrase division process, in order to adjust the divided phrases to be longer or shorter.

At this time, the difficulty arising from outputting partial translations of a sentence can be substantially eliminated by: determining positions in which to insert auxiliary symbols using the division positioning unit; and generating the auxiliary symbols at the time of building translated phrases using the translated phrase building unit.

When outputting the translation result, an output formatting unit reshapes the output format before the translation result is output to an output unit, so that the correspondence or relationship between the original phrases and the translated phrases can be clearly understood.

Thus, the invention described herein makes possible the advantages of (1) providing a machine translation apparatus which does not require designers for grammar rules, etc., to create a special system of rules of syntactic analysis and therefore provides flexibility in the designing of rules of syntactic analysis and rules of dividing sentences of an input text and facility for a user who desires to utilize its translation results; and (2) providing a machine translation apparatus which is capable of controlling the general operation tendency in partial translation operations, providing a readable output text, and which reduces the difficulty in understanding a translation which is output in small portions.

These and other advantages of the present invention will become apparent to those skilled in the art upon reading and understanding the following detailed description with reference to the accompanying figures.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 4 is a diagram showing an exemplary content of a buffer employed in the translation process shown in FIG. 1.

FIG. 7 is a diagram showing an exemplary content of a buffer employed in the translation process shown in FIG. 1.

FIG. 8 is a diagram showing an exemplary content of a buffer employed in the translation process shown in FIG. 1.

FIG. 9 is a diagram showing an exemplary content of division rule data in a storage unit shown in FIG. 1.

FIG. 11 is a diagram showing an exemplary content of a buffer employed in the translation process shown in FIG. 1.

FIG. 12 is a diagram showing an exemplary content of a buffer employed in the translation process shown in FIG. 1.

FIG. 13 is a diagram showing an exemplary content of a buffer employed in the translation process shown in FIG. 1.

FIG. 14 is a diagram showing an exemplary translation result output to an output unit of a machine translation apparatus according to the present invention.

FIG. 15 is a diagram showing exemplary division rule data to be used for a machine translation apparatus according to an example of the present invention in which a user is allowed to adjust the tendency of the phrase division operation.

FIG. 17 is a diagram showing an exemplary translation result as output to the output unit in the case where phrases are adjusted to be generally long in the above example.

FIG. 19 is a diagram showing an exemplary translation result as output to the output unit in the case where phrases are adjusted to be generally short in the above example.

FIG. 21 is a diagram showing exemplary auxiliary symbol generation rule data to be employed in the above example.

FIG. 23 is a diagram showing an exemplary content of a buffer employed in a phrase division process specific to the above example.

FIG. 24 is a diagram showing an exemplary translation result as output to the output unit in the above example.

FIG. 25 is a diagram showing an exemplary translation result as output to the output unit of a machine translation apparatus according to an example of the present invention in which underlines which are divided at borders between original phrases are provided in order to clarify ranges of original phrases.

FIG. 27 is a diagram showing an exemplary translation result as output to the output unit in the above example.

FIG. 28 is a diagram showing an exemplary translation result as output to the output unit in the above example.

DESCRIPTION OF THE PREFERRED EMBODIMENTS

Hereinafter, the machine translation apparatus according to the present invention will be described by way of examples, with reference to the accompanying figures. In the figures, like component elements are indicated by like numerals.

Hereinafter, the term "phrase" is employed to encompass all of the following academic or grammatical categories: words, phrases, and clauses. Therefore, the phrase can consist of a single word.

(EXAMPLE 1)

The present example describes an exemplary machine translation apparatus in the case where the source language is English and the target language is Japanese. The machine translation apparatus converts a sentence expressed in the source language into a sentence expressed in the target language. Hereinafter, an "original" word means a word expressed in the source language, and a "translated" word means a word expressed in target language, and so on.

Figure 1:
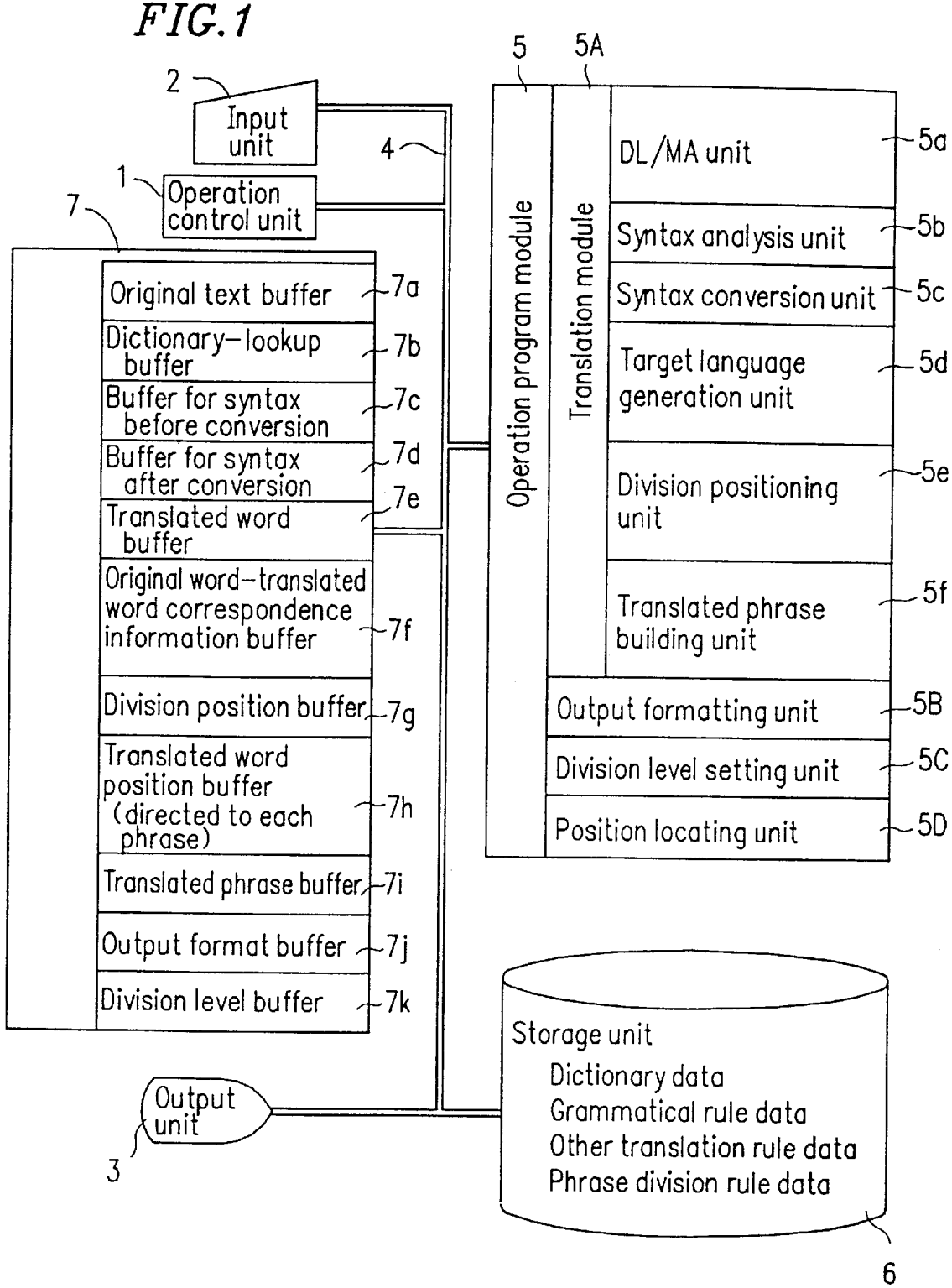
FIG. 1 is a block diagram showing a machine translation apparatus according to an example of the present invention.

FIG. 1 is a block diagram showing a configuration for the machine translation apparatus according to Example 1 of the present invention. Reference numeral 1 denotes an operation control unit, which is implemented by mainly using a CPU (Central Processing Unit) in the actual configuration.

Reference numeral 2 denotes an input unit, which is implemented by using an input device, e.g., a keyboard a mouse, a pen tablet, a scanner, and a character recognition device, a communication device connected to a network, or the like in the actual configuration.

Reference numeral 3 denotes an output unit, which can be implemented by using a display device, e.g., a CRT (Cathode Ray Tube) or a LCD (Liquid Crystal Display Device); a printing device, e.g., a printer; a communication device connected to a communication network; or the like in the actual configuration.

Reference numeral 4 denotes bus lines for transferring data or instructions from the operation control unit 1, which can be implemented by using 32-bit bus lines, for example, in accordance with the specific CPU, etc. used for the operation control unit 1.

Reference numeral 5 denotes an operation program module, which is implemented by using a software program stored in a RAM (Random Access Memory) or the like. Reference numeral 6 denotes a storage unit, e.g., a RAM, for storing dictionary data, grammar rule data and other translation rule data to be used for the translation, and phrase division rule data to be used for dividing sentences into phrases. Reference numeral 7 denotes a main operation memory. The memory area thereof is divided so as to provide a plurality of buffer regions (to be described later).

As shown in FIG. 1, the operation program module 5 includes a translation module 5A, an output formatting unit 5B, a division level setting unit 5C, and a position locating unit 5D.

Figure 2:
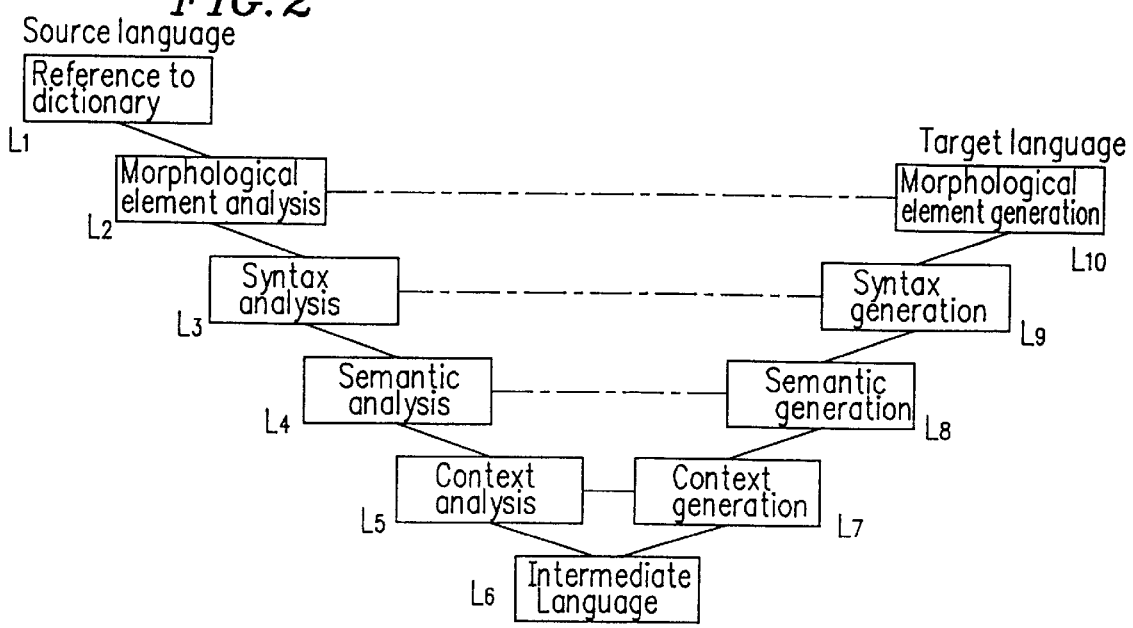
FIG. 2 is a diagram describing various translation levels of a machine translation operation by a machine translation apparatus according to an example of the present invention.

In general, a machine translation process involves various analysis levels as shown in FIG. 2. Starting from the upper left corner of the figure, when a source language is input, the processes at the respective analysis levels are performed, i.e., reference to the dictionary data at level L1, morphological element analysis at level L2, syntax analysis at level L3, and so on.

Machine translation apparatus can be generally categorized into two methods in terms of analysis levels. One is a so-called pivot method, in which the analysis processes up to level L6 are performed, thus arriving at an intermediate language (which relies on or resembles neither the source language nor the target language), and then proceeds to the context generation (level L7), semantic generation (level L8), syntax generation (level L9), and morphological element generation (level L10), respectively, finally arriving at a target language.

The other is a so-called transfer method. According to the transfer method, the analysis processes up to either syntax analysis (level L3), semantic analysis (level L4), or context analysis (level L5) are performed, thus obtaining an internal structure of a source language, which is converted into an internal structure on the same level of a target language. Thereafter, an output text in the target language is generated.

The above-mentioned analysis processes will be described in more detail below:

Reference to dictionary data/morphological element analysis

The dictionary data in the storage unit 6 (shown in FIG. 1) is referred to, whereby an input sentence is divided into respective morphological element sequences (i.e., word sequences). After grammatical information (e.g., parts of the sentence) and translated words for these words are obtained, further analysis is performed as to the tense, person, number, etc.

Syntax analysis

Determines sentence structure (which can be expressed using a syntax analysis tree, for example) such as which word refers to which word.

Semantic analysis

Among a plurality of syntax analysis results, those which do not make sense are distinguished from those which do make sense.

Context analysis

Attempts to understand a topic (i.e., a context) over a plurality of sentences, thereby eliminating omissions and ambiguity.

The translation module 5A employed in the machine translation apparatus according to the present invention performs analysis processes up to at least the syntax analysis (level 3 shown in FIG. 2).

In order to achieve translation based on the above principle, the constituent elements of the translation module 5A includes a dictionary-lookup/morphological element analysis unit (hereinafter referred to as the "DL/MA unit") 5a, a syntax analysis unit 5b, a syntax conversion unit 5c, and a target language generation unit 5d, as shown in FIG. 1. The translation module 5A of the machine translation apparatus of the present invention further includes a division positioning unit 5e for determining positions in which to divide a sentence into phrases (by referring to data being translated) and a translated phrase building unit 5f for building phrases from the words of the target language (which are generated by the target language generation unit 5d).

Figure 29:
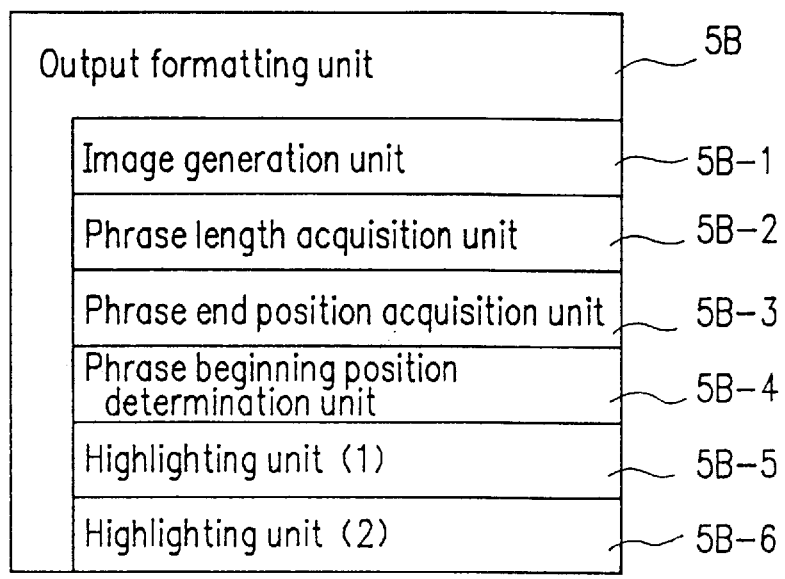
FIG. 29 is a diagram showing a detailed configuration of an output formatting unit.

The output formatting unit 5B generates an output image including the original text and the output text (i.e., result of translation) in various formats that are suitable for phrase-by-phrase translation. As shown in FIG. 29, the output formatting unit 5B includes an image generation unit 5B-1, a phrase length acquisition unit 5B-2, a phrase end position acquisition unit 5B-3, a phrase beginning position determination unit 5B-4, a highlighting unit (1) 5B-5, and a highlighting unit (2) 5B-6. The highlighting unit (1) 5B-5 and the highlighting unit (2) 5B-6 are employed in different embodiments of the invention for displaying a somehow highlighted text.

Portions of the output formatting unit 5B other than the above-mentioned elements have functions common to general computer appliances capable of displaying text data on a display screen and editing such a text, e.g., word processors or text editors.

According to the present example, the output formatting unit 5B generates an output format in which the beginning of an original phrase is aligned with the beginning of a corresponding translated phrase in every pair of such original phrases and corresponding translated phrases displayed on the screen. In another output format (described later in another embodiment of the present invention), the texts are displayed in such a manner that the ranges of the respective original phrases can be easily recognized. Still another output format (described later in still another embodiment of the present invention) displays a specific original phrase to be edited by a user and its corresponding translated phrase in a color different from the color of the other portions (e.g., so that characters are displayed in reverse video or highlighted with underlines).

The division level setting unit 5C and the position locating unit 5D will be employed in other embodiments of the present invention (described later).

Portions of the main operation memory 7 are assigned as various buffers which will be employed in the course of the entire translation operation, e.g., an original text buffer 7a, a dictionary-lookup buffer 7b, a buffer 7c for a syntax before conversion, a buffer 7d for a syntax after conversion, a translated word buffer 7e, an original word-translated word correspondence information buffer 7f, a division position buffer 7g, a translated word position buffer 7h (directed to each phrase), a translated phrase buffer 7i, an output format buffer 7j, and a division level buffer 7k.

Figure 3:
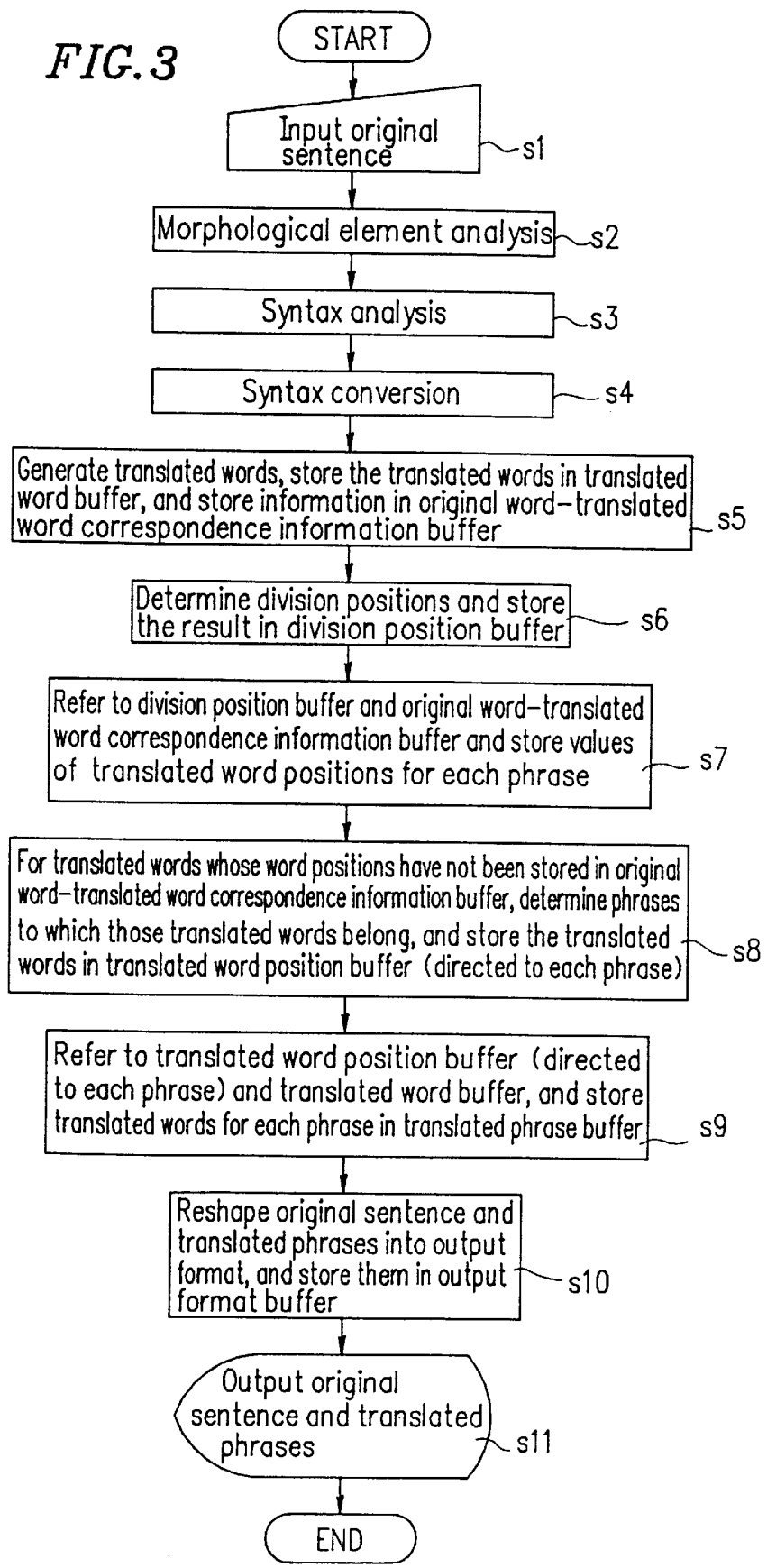
FIG. 3 is a flowchart showing a translation process by a machine translation apparatus according to an example of the present invention.

Hereinafter, a translation operation by the machine translation apparatus in accordance with the present example of the invention will be described with reference to the figures. FIG. 3 is a flowchart showing an operation by the machine translation apparatus according to the present example.

An original text as follows (English) is processed by the machine translation apparatus in the present example:

"In addition to sequential files, the second file structure used by SHARP-BASIC is random access."

In step s1 in FIG. 3, an original sentence (i.e., a sentence expressed in the source language) is input from the input unit 2 and stored in the original text buffer 7a along with its word position information, as shown in FIG. 4. Next, at step s2, the DL/MA unit 5a determines the meanings of the words and phrases of the original sentence stored in the original text buffer 7a by referring to dictionary data, and subjects the original sentence to a morphological element analysis. The dictionary-lookup buffer 7b stores the meanings of the words and phrases and the categories of morphological elements thus obtained.

Figure 5:
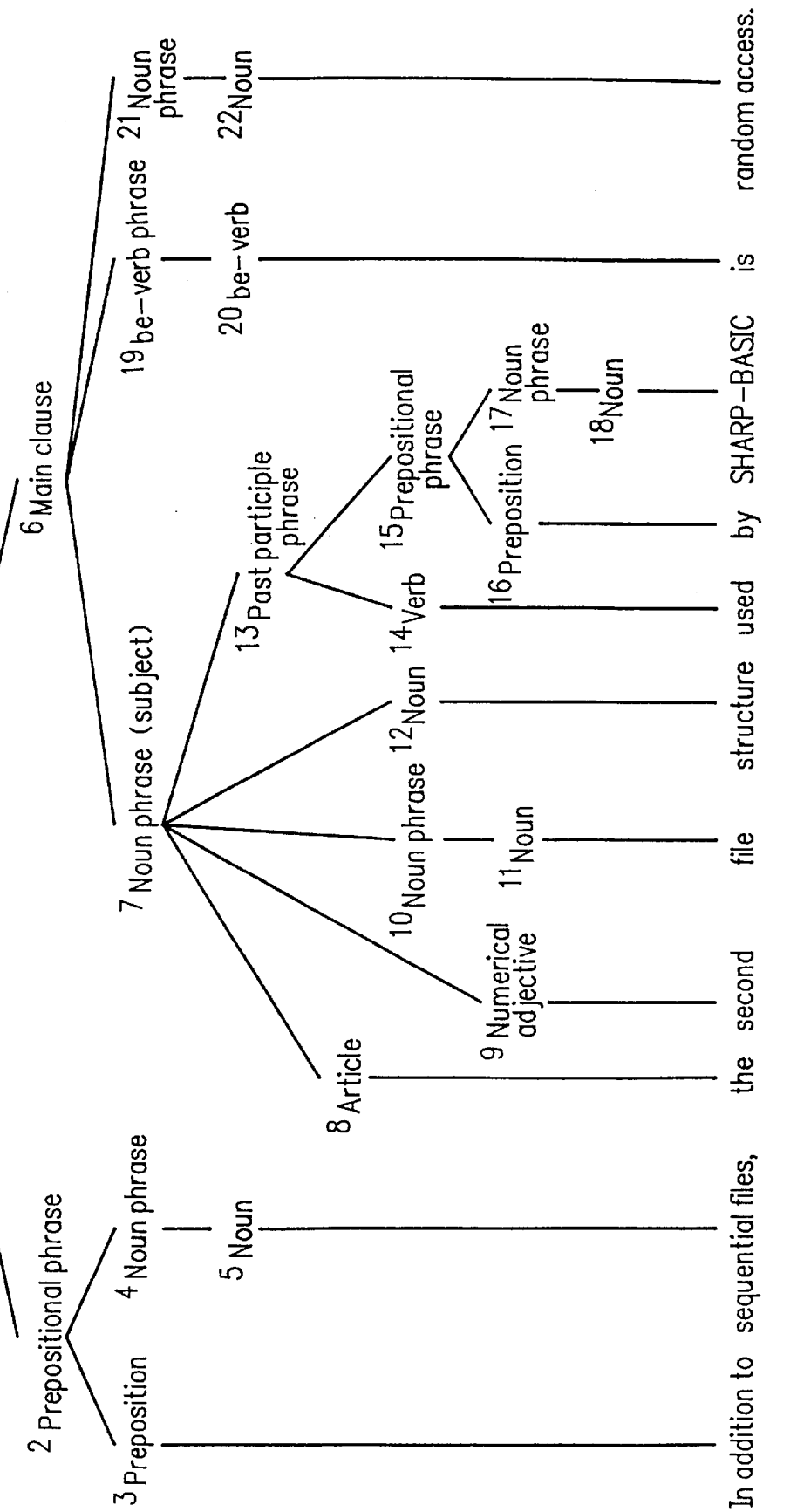
FIG. 5 is a diagram showing an exemplary syntax analysis result in the translation process shown in FIG. 1.

In step s3, the syntax analysis unit 5b generates a syntax analysis tree as shown in FIG. 5. The buffer 7c (for a syntax before conversion) stores the generated syntax analysis tree.

Figure 6:
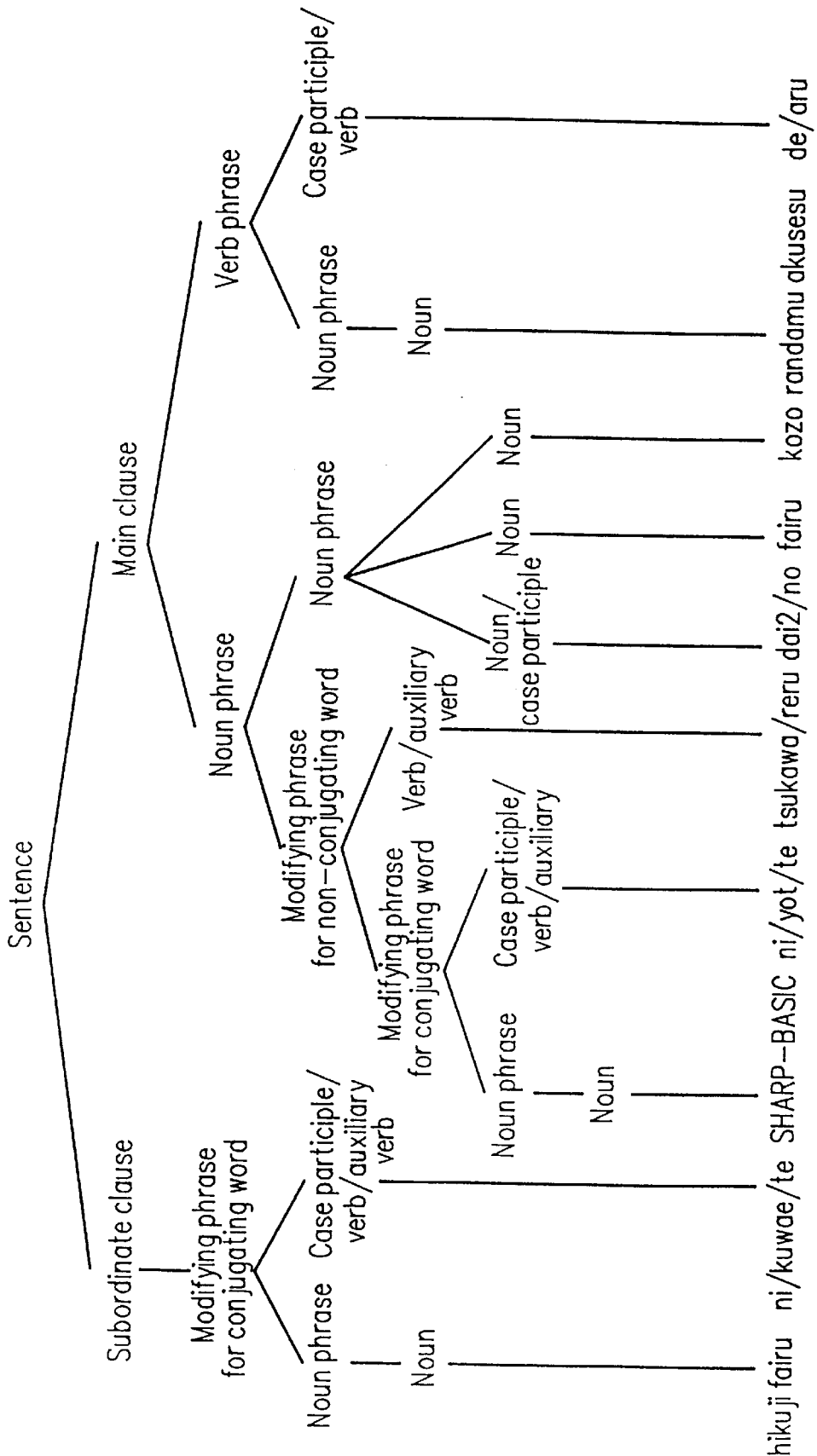
FIG. 6 is a diagram showing an exemplary syntax conversion result in the translation process shown in FIG. 1.

In step s4, the syntax conversion unit 5c generates a syntax analysis tree of the target language (i.e., Japanese) shown in FIG. 6, based on the syntax analysis tree of the source language shown in FIG. 5. The buffer 7d (for a syntax after conversion) stores the generated syntax analysis tree.

In step s5, the translated word buffer 7e stores the following translated words (which are generated by the target language generation unit 5d) corresponding to the words of the original text:

| | |
|---|---|
| "chikuji fairu" | (sequential files) |
| "ni kuwaete" | (in addition to) |
| "," | (,) |
| "shapu-BASIC" | (SHARP-BASIC) |
| "niyotte" | (by) |
| "tsukawareru" | (used) |
| "dai2 no" | (the second) |
| "fairu" | (file) |
| "kozo" | (structure) |
| "randamu akusesu" | (random access) |
| "dearu" | (is) |
| "." | (.) | and a participle:

"ha"

which is generated by the target language generation unit 5d, as shown in FIG. 7.

The translated word buffer 7e stores information on the positions of words within one translated sentence of the target language. The word position information represents positions in an entire sentence of the target language that corresponds to one whole sentence of the source language, rather than positions in each translated phrase (consisting of words, phrases, or clauses in the academic sense). This facilitates the process of determining division positions in accordance with various division levels (described later). Moreover, in step s5, the original word-translated word correspondence information buffer 7f stores information indicating relationship between the positions of the respective words in a translated sentence (i.e., the target language) corresponding to the words in the source language, as shown in FIG. 8.

In step s6, the division positioning unit 5e determines positions at which the original sentence is to be divided into a plurality of phrases based on "phrase categories". Here, the phrase categories refer to types of grammatical components described as an attribute, such as "sentence", "prepositional phrase", "main clause". Referring to FIG. 5, specifically, the categories denote nodes of the syntax analysis tree except end nodes, such as "preposition", "noun", which are indicated immediately above the each word. The determination of the division positions is performed by applying division rules (shown in FIG. 9) stored in the storage unit 6 to the syntax analysis tree (shown in FIG. 5) stored in the buffer 7c for a syntax before conversion.

Hereinafter, a division position determination scheme will be described. According to this scheme, nodes of a syntax analysis tree are searched for in a predetermined order, so as to examine whether or not the division rules are applicable to each node. If any division rule is found to be applicable to a given node, then a division position is set at that node. The application of the division rules will be described with reference to FIG. 5 below.

Division rule 1 "A division must be made between nodes which are immediately under a 'sentence' node" is applied to a "sentence" node (node No.(1)). In the present example, a "prepositional phrase" node (node No.(2)) and a "main clause" node (node No.(6)) are immediately under a "sentence" node (node No.(1)). Thus, a division is made between these two nodes, so that the original sentence is divided between the "sequential files" and "the".

Division rule 2 "Portions combined by a 'main clause' node must be separated" is applied to the "main clause" node (node No.(6)). In the present example, "the second file structure used by SHARP-BASIC is random access" is found to be combined by the "main clause" node (node No.(6)). Therefore, this portion is separated from the rest of the original sentence, so that a division is again made between "sequential files" and "the".

Division rule 6 "Portions combined by a 'subject' node must be separated" is applied to a "subject" node (node No.(7)). In the present example, "the second file structure used by SHARP-BASIC" is found to be combined by the "subject" node (node No.(7)). Therefore, this portion is separated, so that a division is again made between "sequential files" and "the", and a division is newly made between "SHARP-BASIC" and "is".

Division rule 9 "Portions combined by a 'past participle' node must be separated" is applied to a "past participle" node (node No.(13)). In the present example, "used by SHARP-BASIC" is found to be combined by the "past participle" node (node No.(13)). Therefore, this portion is separated, so that a division is made between "structure" and "used", and a division is again made between "SHARP-BASIC" and "is".

As a result of applying the above-mentioned division rules to the original sentence, divisions are made in the following positions:

between "sequential files" and "the";
between "structure" and "used"; and
between "SHARP-BASIC" and "is".

Figure 10:
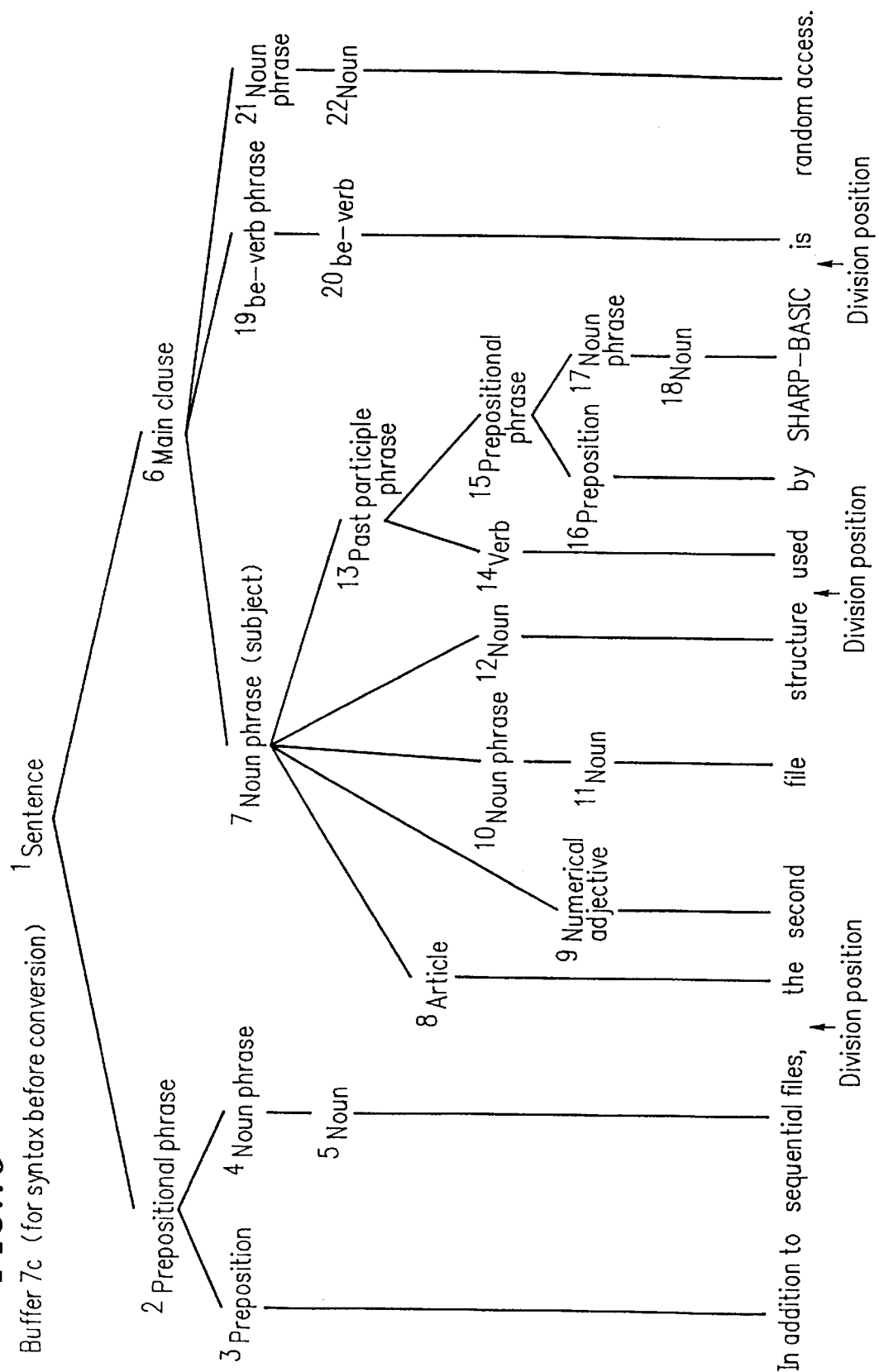
FIG. 10 is a diagram showing an exemplary phrase division result by a machine translation apparatus according to an example of the present invention.

These division positions in the syntax analysis tree of the source language are shown in FIG. 10.

In step 6, the division position buffer 7g stores data indicating the division positions. FIG. 11 shows a format of the data stored in the division position buffer 7g. The "word position" column in FIG. 11 stores the position of the first word of each one of a plurality of original phrases obtained by dividing the original sentence in the above-described manner. The sentence shown in FIG. 10 is divided into the following four phrases:

"In addition to sequential files,"
"the second file structure"
"used by SHARP-BASIC"
"is random access"

The positions of the first words of the respective phrases, i.e., "In", "the", "used", and "is" in the original sentence are indicated in the original text buffer 7a (shown in FIG. 4) as "1", "6", "10", and "13", respectively. The operation control unit 1 transfers and stores these values representing the respective word positions into the "word position" column of the division position buffer 7g (shown in FIG. 11) via the bus lines 4.

In steps s7 to s9, the translated phrase building unit 5f (shown in FIG. 1) generates phrases in the target language based on the phrases in the source language.

In step s7, words to constitute each phrase of the target language are obtained based on the original word-translated word correspondence information generated in step s5 and stored in the original word-translated word correspondence information buffer 7f (shown in FIG. 8), and the division position information generated in step s6 and stored in the division position buffer 7g (shown in FIG. 11). Based on these words constituting each phrase of the target language and on the positions of those words stored in the translated word buffer 7e (shown in FIG. 7), the positions of the words of the target language corresponding to each phrase of the source language are stored in the translated word position buffer 7h. FIG. 12 shows a format of the data stored in the translated word position buffer 7h.

Next, the operation performed in step s7 is described. For the first phrase "In addition to sequential files" of the source language, for example, the "word position" column in the row corresponding to the sequential number 1 of the division position buffer 7g (shown in FIG. 11) is referred to, revealing that the position of the first word of that phrase in the original sentence is "1" (corresponding to "In"). By similarly referring to the division position buffer 7g, it is revealed that the position of the first word of the second phrase of the source language is "6" (corresponding to "the"). Therefore, the position of the last word of the first phrase is determined to be 5 (which is calculated by subtracting 1 from the position of the first word of the second phrase). Accordingly, the first phrase of the source language consists of words whose positions in the source language sentence are as follows:

1, 2, 3, 4, and 5 (respectively).

Next, by referring to the original word-translated word correspondence information buffer 7f (shown in FIG. 8), the positions of the words of the target language corresponding to these five words of the source language are derived to be:

2, 2, 2, 1, and 1 (respectively).

By sorting these values indicating word positions in an ascending order and then eliminating values that have appeared more than once, the following two values are obtained:

1, 2.

These values indicate the positions of the words constituting a translation of the first phrase of the source language. These values are stored in the "translated word position" column of the translated word position buffer 7h (directed to each phrase) in the row corresponding to phrase No. 1.

Similarly, the positions of the words constituting a translation of the second phrase of the source language are derived to be:

7, 8, and 9.

The positions of the words constituting a translation of the third phrase of the source language are derived to be:

4, 5, and 6.

The positions of the words constituting a translation of the fourth phrase of the source language are derived to be:

12 and 13.

The values corresponding to the phrases are stored in the "translated word position" column of the translated word position buffer 7h in the rows corresponding to their respective phrase Nos.

In step s8, for those translated words whose word position values have not been stored in the translated word position buffer 7h, it is determined which phrases those translated words belong to. The translated words which have been determined to belong to certain phrases are stored in the "translated word position" column of the translated word position buffer 7h in the rows corresponding to the respective phrases.

Values representing the positions of such translated words are not found in the "corresponding translated word position" column of the original word-translated word correspondence information buffer 7f. This indicates that these words were not generated as translated words corresponding to certain words in the source language. That is, this indicates that these words were generated by the target language generation unit 5d as supplements. Accordingly, these translated words do not have correspondence or relationship with any words in the source language. In the present example, the word "ha" in the translated word buffer 7e (shown in FIG. 7) exemplifies such a translated word.

For example, the following scheme can be used in order to determine which phrase in the target language a word that has no correspondence or relationship with words in the source language belongs to:

First, with respect to a value that is smaller by one than the value indicating the position of a word having no correspondence or relationship with any words in the source language, it is examined in which row (i.e., which original word position) of the "corresponding translated word position" column of the original word-translated word correspondence information buffer 7f that value is accommodated. If the value is found in a row corresponding to a certain original word, then the word (having no correspondence or relationship with any words in the source language) is determined to belong to a phrase which that certain original word belongs to. On the other hand, if the value is not found in that row, then a similar examination is conducted for a value which is further smaller by one (i.e., a value smaller by two than the value of the word having no correspondence or relationship with any words in the source language) in the translated word buffer 7e. Thus, the value in the translated word buffer 7e indicating a word position is decremented by one every time the search is conducted. This search is conducted until the value is found.

If the value that is smaller by one than the value indicating the position of a word having no correspondence or relationship with any words in the source language is found in a plurality of rows (i.e., a plurality of original word positions) of the "corresponding translated word position" column in the original word-translated word correspondence information buffer 7f, then the largest of such values indicating original word positions is adopted.

Next, a specific example of the above scheme will be described. In this exemplary case, it is determined which phrase of the target language the word "ha" in the translated word buffer 7e belongs to. The value indicating the position of the word "ha" in the translated buffer 7e is 10. The value 9 (which is smaller by one than 10) is found in the "corresponding translated word position" in the row corresponding to word position "9" of the original word-translated word correspondence information buffer 7f (shown in FIG. 8). Now it must be determined which phrase the original word at position "9" belongs to. By referring to the division position buffer 7g, it is discovered that the second phrase includes original words from positions 6 to 9. Therefore, the original word position 9 is determined to belong to the second phrase.

Thus, the phrases to which words (in the translated sentence) having no correspondence or relationship with any words in the source language belong are determined. Then, the values of the translated word positions corresponding to such words (in the translated sentence) are stored in the "translated word position" column of the translated word position buffer 7h in the rows having corresponding phrase Nos. In this exemplary case, the value 10 of the position of the word "ha" in the translated sentence is stored in the "translated word position" column in the row corresponding to phrase No. 2 of the translated word position buffer 7h. As a result, the translated word position buffer 7h (provided for each phrase) will be in a state shown in FIG. 12, indicating that the positions of the translated words constituting the translation for phrase No. 2 are:

7, 8, 9, and 10.

The above-mentioned means or scheme for determining the phrases that words (in the translated sentence) having no correspondence or relationship with any words in the source language belong to is merely an example. It is preferable to select the means or scheme in accordance with the grammatical nature of the source language and the target language.

In step 9, a translation for each phrase is generated by referring to the translated word buffer 7e based on the content of the translated word position buffer 7h generated in steps s7 and s8. The generated translates are stored in the translated phrase buffer 7i (shown in FIG. 1).

The operation in step s9 is described below.

For example, the positions of the words constituting the first phrase are known to be 1 and 2, based on the "translated word position" column of the translated word position buffer 7h in the row corresponding to phrase No. 1 (shown in FIG. 12). As shown in FIG. 7, the translated word buffer 7e stores a translated word "chikuji fairu" in Translated Word Position 1, and a translated word "ni kuwaete" in Translated Word Position 2. Then, these translated words are combined in an ascending order of the values of their positions, resulting in a character sequence "chikuji fairu ni kuwaete". This character sequence "chikuji fairu ni kuwaete" is stored in the "translated phrase" column in the row corresponding to phrase No. 1 of the translated phrase buffer 7i. Similarly, the translated words "dai2 no", "fairu", "kozo", and "ha" are combined in the ascending order (described above ) and stored in the "translated phrase" column of the translated phrase buffer 7i in the row corresponding to phrase No. 2; the translated words "shapu-BASIC", "niyotte", and "tsukawareru" are combined in the ascending order and stored in the "translated phrase" column of the translated phrase buffer 7i in the row corresponding to phrase No. 3; and the translated words "randamu akusesu" and "dearu" are combined in the ascending order and stored in the "translated phrase" column of the translated phrase buffer 7i in the row corresponding to phrase No. 4. FIG. 13 shows a translated phrase buffer 7i in which translated phrases are stored. Thus, translated phrases corresponding to the respective phrases in the input text are obtained.

In step s10, the output formatting unit 5B generates an output format to be used when outputting the translation results to the output unit 3, and stores the output format in the output format buffer 7j shown in FIG. 1. The output format is, for example, data which realizes a displayed image shown in FIG. 14. Specifically, the output format buffer 7j stores bit map data representing an image on the display of the output unit 3. The bit map data includes a plurality of pixel value such as, for example, luminance of each color of RGB (red, green and blue). As seen from FIG. 14, the beginning of each phrase in the original sentence is aligned with the beginning of the corresponding phrase in the translated sentence on a display screen of the output unit 3. This enables the user to easily and clearly grasp the relationship between the original phrases and the translated phrases.

In step s11, the original phrases and the translated phrases are output to the output unit 3 based on the data stored in the output format buffer 7j.

Figure 30:
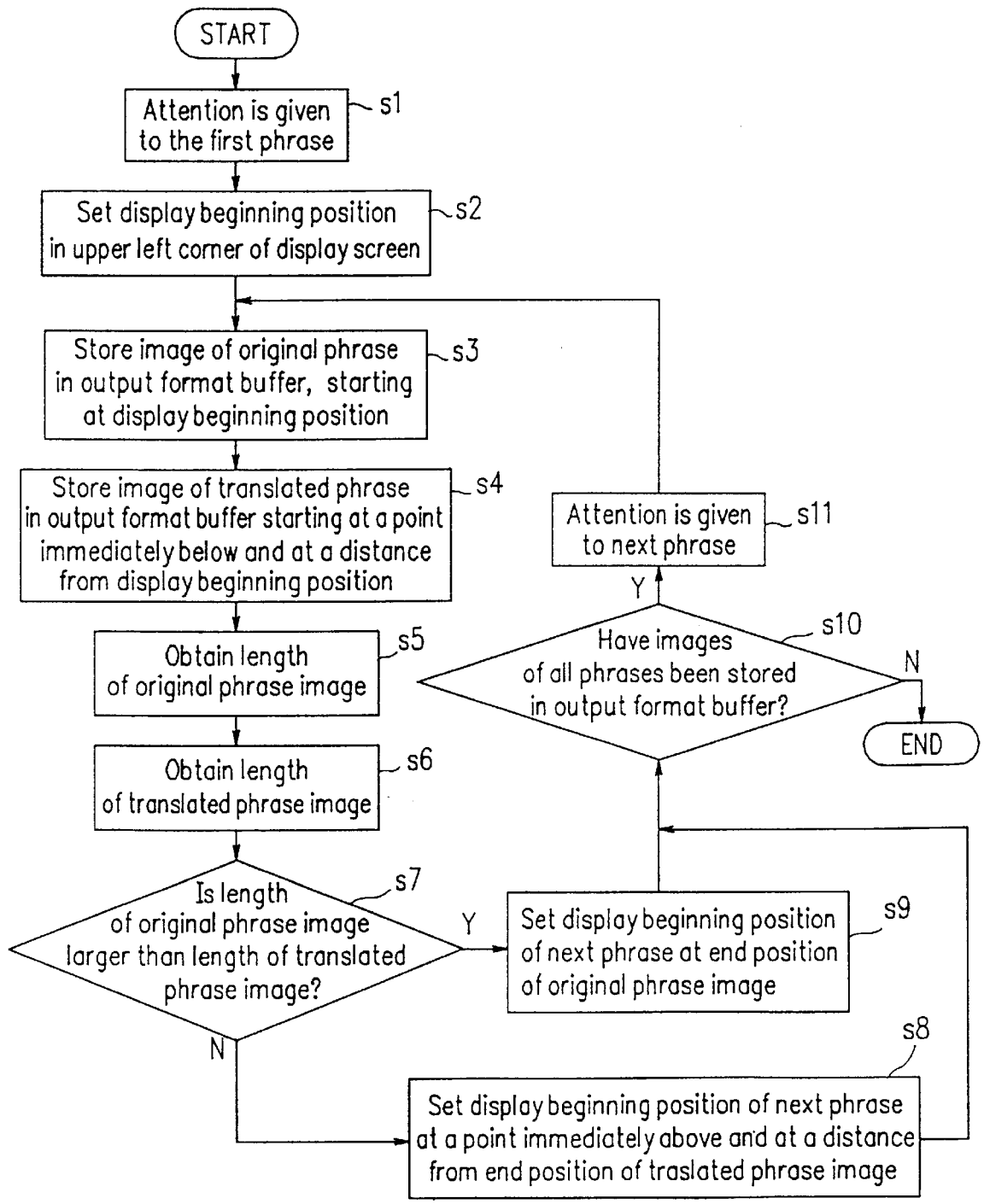
FIG. 30 is a flowchart showing an operation of the output formatting unit.

In the machine translation apparatus according to Example 1 of the present invention, the output formatting unit 5B can have a configuration described below. FIG. 30 is a flowchart illustrating an operation of the output formatting unit 5B according to Example 1. Herein, descriptions of operations common to any computer appliances for generally processing and displaying text data, e.g., folding lines at the end of the display area, scrolling, etc. are omitted.

In step s1, attention is given to the first original phrase "In addition to sequential files" and its corresponding translated phrase "chikuji fairu ni kuwaete".

In step s2, a position at which a displayed image should begin (hereinafter referred to as a "display beginning position") is set at the upper left corner of the display screen of the output unit 3.

In step s3, the phrase beginning position determination unit 5B-4 determines the display beginning position of the first original phrase in the following manner.

First, in the case of the first phrase, the display beginning position is set to a point which is below by an upper margin and right by a left margin to the upper left corner of the display area of the output unit 3. The upper margin is a vertical distance between the upper left corner and the display beginning position. The left margin is a horizontal distance between the upper left corner and the display beginning position. Both the upper margin and the left margin are represented by, for example, a number of pixels on the display. The display area means an area where an image can be displayed on the screen of the output unit 3, also represented by a number of pixels, for example, 640 (horizontal)*480 (vertical). Second, in the case of the second or later phrase, the display beginning position is set to a point which is right to a phrase end position (described later) by a predetermined interval between the adjacent phrases. The phrase end position is obtained by the phrase end position acquisition unit 5B-3.

The image generation unit 5B-1 generates an image of the first original phrase. The image of the first original phrase is set at a position which is located after the display beginning position, based on the data stored in the output format buffer 7j. Herein, an "image" is defined as a region of the phrase that is displayed on the screen of the output unit 3. The length of an "image" is defined as the number of characters constituting the phrase in the case of a character-base display, or the number of dots of characters constituting the phrase along the transverse or horizontal direction in the case of a bit map display.

In step s4, the phrase beginning position determination unit 5B-4 sets the display beginning position of the first translated phrase at a point which is below and at a distance from the display beginning position of the first original phrase. The image generation unit 5B-1 generates an image of the second original phrase and sets the image of the first translated phrase at a position which is located after the display beginning position (i.e., a point below and at a distance from the display beginning position of the first original phrase) based on the data stored in the output format buffer 7j.

In steps s5 and s6, the phrase length acquisition unit 5B-2 calculates the length of the image of the first original phrase and the length of the image of the first translated phrase. The operation of the image generation unit 5B-1 and the phrase length acquisition unit 5B-2 will be described below in this example.

Regarding a sentence in the original language, by referring to the division position buffer 7g, the first phrase is recognized to include the first to the fifth words of the sentence since the beginning word position of the first phrase is "1" and the beginning word position of the second phrase is "6". Then, by referring to the original text buffer 7a, code data of each character to be displayed actually is obtained. Next, a temporary image buffer is allocated in the main operation memory 7 in order to store image data of the first phrase temporarily. A character image corresponding to each character code is obtained by referring to character font data for displaying characters which is stored in the storage unit 6 and is set in the temporary image buffer sequentially until all of the words in the phrase are set.

When the character font data for displaying characters is referred, a number of pixels in the horizontal direction for each character (including a space) is accumulated to obtain a summated number of pixels, thereby obtaining the length of the image for the phrase represented by a number of the pixels on the display of the output unit 3. Then this number of the pixels corresponding to the length of the image is stored in the phrase length buffer which is allocated in the main operation memory 7. Finally, the image data in a bit map style stored in the temporary image buffer is set in the output format buffer 7j so that the upper left position of the phrase to be displayed is located at the phrase beginning position by converting the location of each pixel in the temporary image buffer to the location in the output format buffer 7*j*.

Regarding a sentence in the target language, by referring to the translated phrase buffer 7*i*, a code of each character to be displayed is obtained, for example, for the first phrase. The remaining procedures are the same as the above-mentioned case in the original language except how to determine the display beginning position of the target language (i.e., step s4 of FIG. 30).

In step s7, the length of the image of the first original phrase and the length of the image of the first translated phrase are compared with each other.

In this case, the original phrase is longer than the translated phrase, so that the phrase end position acquisition unit 5B-3 derives an end position of the image of the first original phrase stored in the output format buffer 7*j* and sets that position as the display beginning position of the next phrase in step s9.

In step s10, it is determined whether or not the images of all the phrases have been stored in the output format buffer 7*j*. Since some phrases are left whose images have not been stored in the output format buffer 7*j*, attention is given to the next phrase in step s11.

As a result, the first translated phrase, which is shorter than the first original phrase, is displayed in such a manner that there is a space between the first translated phrase and the display beginning position of the subsequent phrase, i.e., the second translated phrase, as in FIG. 14.

As for the second original phrase "the second file structure" and the second translated phrase "dai2 no fairu kozo ha", the image of the original phrase is longer than the image of the translated phrase. Therefore, the images are stored in the output format buffer 7*j* by the same process performed for the first phrase.

As for the third original phrase "used by SHARP-BASIC" and the third translated phrase "shapu-BASIC niyotte tsukawareru", the image of the translated phrase is longer than the image of the original phrase on the display screen. The operation in this case is described hereinafter:

In steps s3 and s4, the images of the original phrase and the translated phrase are stored in the output format buffer 7*j* by the same process performed for the first phrase.

In steps s5 and s6, the phrase length acquisition unit 5B-2 derives the length of the image of the original and the length of the image of the corresponding translated phrase.

In step s7, the length of the image of the original phrase and the length of the image of the translated phrase are compared with each other. In this case, the translated phrase is longer than the original phrase, so that the phrase end position acquisition unit 5B-3 derives an end position of the image of the third translated phrase stored in the output format buffer 7*j* and sets that position as the display beginning position of the next phrase in step s8.

Since there still are phrases whose images have not been stored in the output format buffer 7*j*, the process proceeds from step s10 to step s11, where attention is given to the next phrase.

As a result, the third original phrase, which is shorter than the third translated phrase, is displayed in such a manner that there is a space between the third original phrase and the display beginning position of the subsequent phrase, i.e., the fourth translated phrase, as in FIG. 14.

Utilizing the above operation, as to each pair containing an original phrase and a translated phrase corresponding to the original phrase, the beginning positions of the original phrases and the translated phrases are aligned with each other on the display of the output unit 3.

(EXAMPLE 3)

The machine translation apparatus according to Example 2 of the present invention has the same configuration as that of the machine translation apparatus according to Example 1 except for the following aspects.

In addition to the configuration of Example 1, the machine translation apparatus further includes a division level setting unit 5C, by which a user inputs a parameter (hereinafter referred to as the "division level") which determines the general lengths of divided phrases to the apparatus, and a division level buffer 7*k* for storing the value of the division level.

A storage unit 6 stores data concerning phrase division rules, which may be either applicable or inapplicable depending on the value of the division level.

A division positioning unit 5*e* determines positions at which an original sentence is to be divided into a plurality of phrases based on the value of the division level and the phrase division rule data stored in the storage unit 6.

Hereinafter, the phrase division rules are described. In Example 2, the general lengths of output phrases can be set in three different levels; that is, the division level can take three different levels. As phrase division rules corresponding to these three division levels, rules shown in FIG. 15 are employed in stead of the rules shown in FIG. 9. The phrase division rules shown in FIG. 15 are unique in that each rule has a "division level" column. The "division level" is a value which indicates whether to coarsely divide or finely divide the sentence, that is, whether to make the lengths of the divided phrases to be generally long or generally short. Each phrase division rule is determined to be either applicable or inapplicable depending on the value of the division level.

If the value of the division level stored in the division level buffer 7*k* is "1", only those phrase division rules (in FIG. 15) whose division levels are indicated to be "1" are applied to the division positioning. If the value of the division level stored in the division level buffer 7*k* is "2", only those phrase division rules (in FIG. 15) whose division levels are indicated to be "1" or "2" are applied to the division positioning. If the value of the division level stored in the division level buffer 7*k* is "3", all the phrase division rules shown in FIG. 15 are applied to the division positioning. This division level can be set by the user via an input unit 2.

Hereinafter, a case will be described where the same sentence used in Example 1 ("In addition to sequential files, the second file structure used by SHARP-BASIC is random access.") is translated by using the machine translation apparatus of Example 2.

Figure 16:
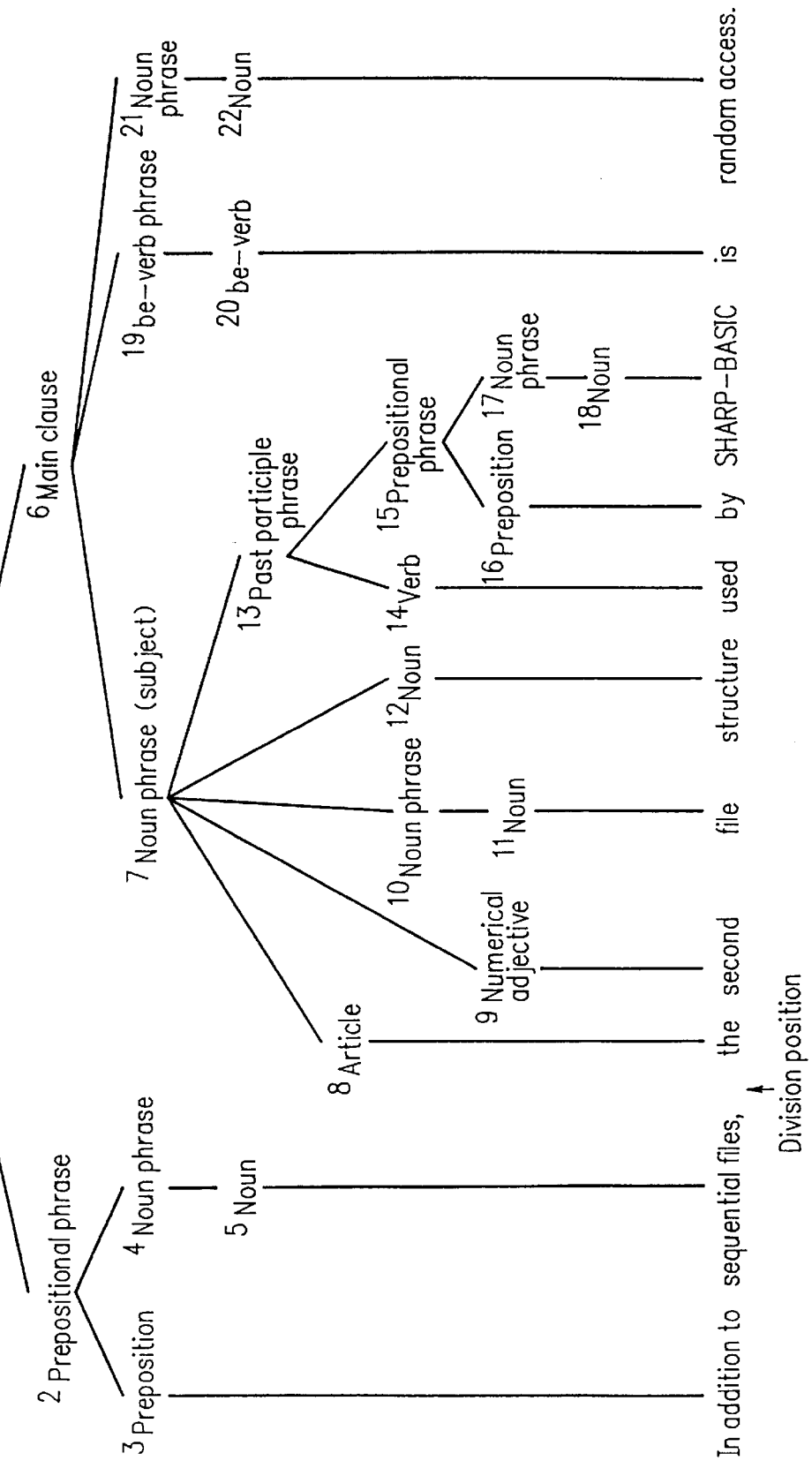
FIG. 16 is a diagram showing the result of a phrase division process, in which phrases are adjusted to be generally long, in the above example.

If the value of the division level is set at "1", there is only one division made in the original sentence, as shown in FIG. 16, resulting in two phrases. FIG. 17 shows a result of the translation when the division level is set at "1".

Figure 18:
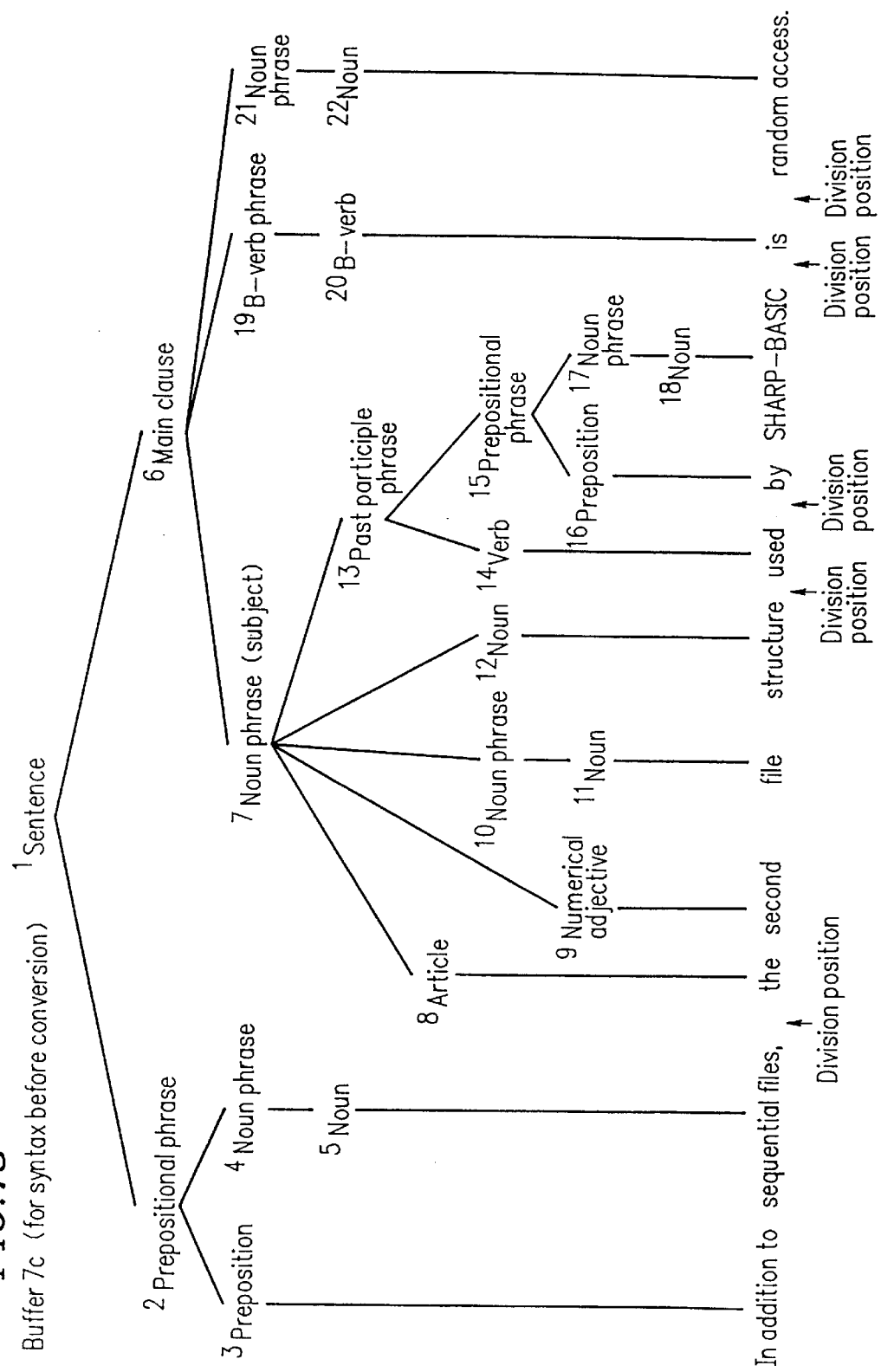
FIG. 18 is a diagram showing the result of a phrase division process, in which phrases are adjusted to be generally short, in the above example.

If the value of the division level is set at "3", there are five divisions made in the original sentence, as shown in FIG. 18, resulting in six phrases. FIG. 19 shows a result of the translation when the division level is set at "3".

If the value of the division level is set at "2", the same translation result described in Example 1 (shown in FIG. 14) is obtained.

(EXAMPLE 3)

The machine translation apparatus according to Example 3 of the present invention has the following function, for example: "When a THAT clause of an original sentence is separated as a phrase, an omission symbol (e.g., "~") is added in front of a translated phrase which was generated corresponding to a phrase the THAT clause refers to". The machine translation apparatus according to Example 3 of the present invention has the same configuration as that of the machine translation apparatus according to Example 1 except for the following aspects.

A storage unit 6 stores data concerning rules for determining the positions at which to generate omission symbols "~", based on data representing an analyzed syntax and data representing division positions.

A division positioning unit 5e determines positions at which to insert omission symbols "~" in accordance with the rules for determining the positions of the omission symbols "~". The information indicating the positions of the omission symbols "~" is stored in a division position buffer 7g.

The division position buffer 7g further includes a column to store data indicating whether or not an omission symbol "~" has been generated.

A translated phrase building unit 5f generates omission symbols "~" based on the data indicating whether or not an omission symbol "~" has been generated (stored in the division position buffer 7g).

Next, a translation operation according to Example 3 of the present invention will be described with reference to the flowchart shown in FIG. 20.

An original text as follows (English) is processed by the machine translation apparatus:

"The reason is that we want these number to be rounded off."

Among the phrase division rules shown in FIG. 15, only those whose division levels are "1" are applied to the division positioning.

The processes from step s1 to step s5 are the same as those performed in the translation operation according to Example 1.

In step s6, the division positioning unit 5e determines where to divide the original sentence into phrases. At the same time, the division positioning unit 5e determines where to generate omission symbols "~" by employing the omission symbol generation rules shown in FIG. 21. If a division position exists between a "referring word" and a "referred word", the omission symbol is generated and inserted between the referring word and the referred word. Here, the referring word denotes a word which modifies another word and the referred word denotes a word which is modified by the referring word. This relation between the referring word and the referred word is obtained after generating the syntax analysis tree as shown in FIG. 5.

Figure 22:
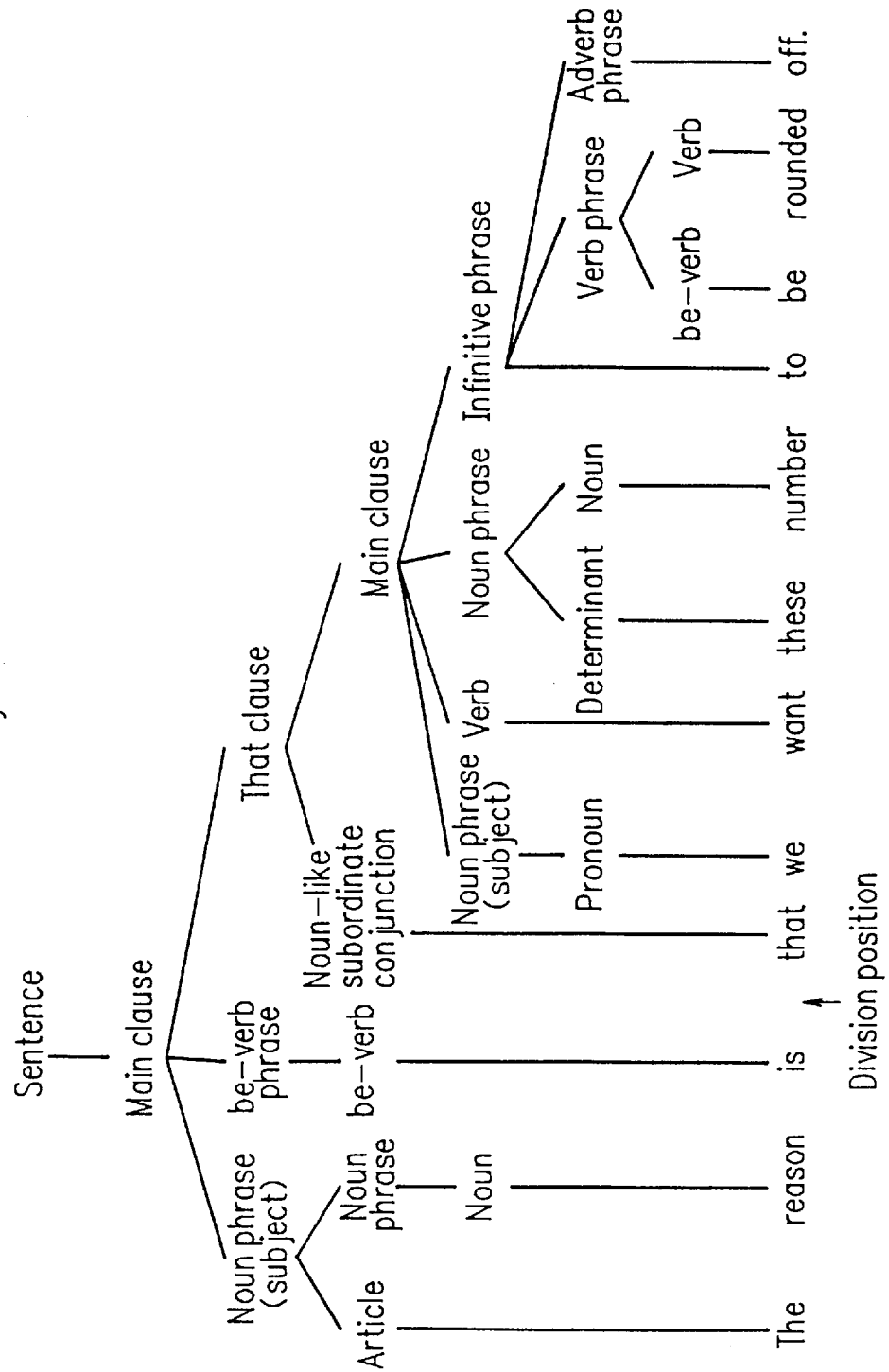
FIG. 22 is a diagram showing the result of a phrase division process according to the above example.

As a result, division positions as shown by arrows in the syntax analysis tree (FIG. 22) are determined, which are stored in the division position buffer 7g as shown in FIG. 23. As seen from FIG. 23, the division position buffer 7g has a column "generation of omission symbol '~'". Herein, data "Yes", which indicates that an omission symbol "~" has been generated, is stored in the column "generation of omission symbol '~'" of the first phrase. The data "Yes" signifies that an omission symbol "~" must be displayed along with the first phrase.

Figure 20:
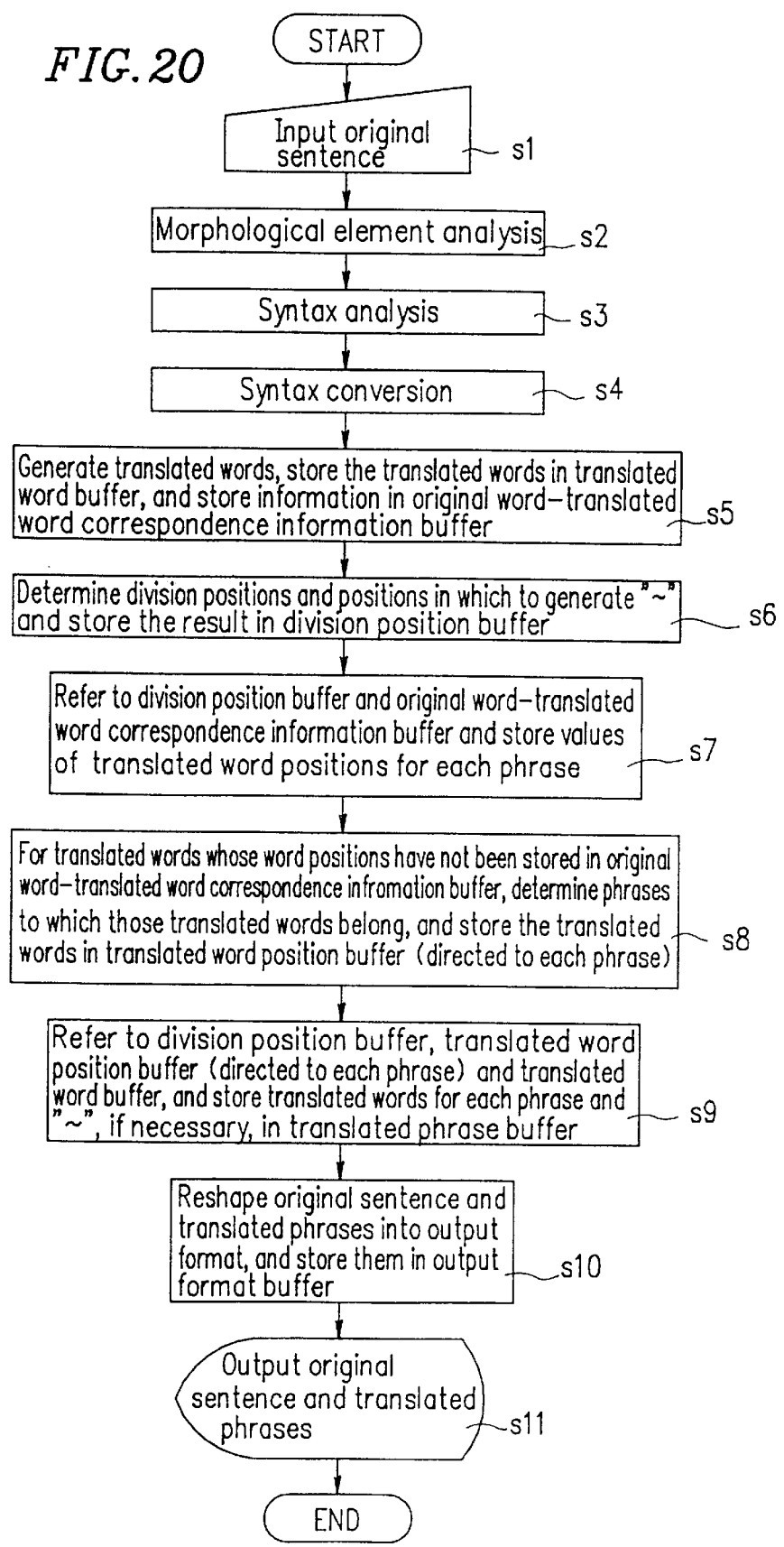
FIG. 20 is a flowchart showing the translation process of a machine translation apparatus according to an example of the present invention which is capable of generating auxiliary symbols in an output translated sentence.

The processes to be performed at steps s7 and s8 as shown in FIG. 20 are the same as those performed in Example 1.

In step s9, translated phrases are generated. When generating a phrase for which data "Yes" is stored in the column "generation of omission symbol '~'" of the division position buffer 7g, an omission symbol "~" is stored in the "translated phrase" column of the translated phrase buffer 7i in the row corresponding to that phrase, while storing a translated phrase in the translated phrase buffer 7i. In this case, data "Yes" is stored in the column "generation of omission symbol '~'" in the row corresponding to the first phrase of the division position buffer 7g. Therefore, the generation of the first translated phrase is performed as follows:

First, "riyu-u dearu", which are translated words correspond to original words of the first original phrase:

"The reason is"

(herein it is assumed that there is no translated word corresponding to "The" owing to the nature of the Japanese language); are combined with "ha" (which is generated by a target language generation unit 5d), and an omission symbol "~" to give a character sequence "riyu-u ha~dearu".

The above character sequence "riyu-u ha~dearu" is stored in the "translated phrase" column of the translated phrase buffer 7i in the row corresponding to phrase No. 1.

In step s10, as in the case of Example 1, an output formatting unit 5B generates data representing an output format, and stores the generated data in an output format buffer 7j. FIG. 24 shows the result of the translation output to the display screen according to Example 3.

(EXAMPLE 4)

The machine translation apparatus according to Example 4 of the present invention has the same configuration as that of the machine translation apparatus according to Example 1 except that the output formatting unit 5B functions in the following manner. FIG. 25 shows an output image of a result of operation according to Example 4.

In Example 4, when the output format is set by the output formatting unit 5B (shown in FIG. 1) at step s10 in FIG. 3, the display beginning positions of the phrase of the source language and the phrase of the target language are aligned with each other on the display screen. In addition to achieving this aligning effect, the output formatting unit 5B draws an underline along each original phrase such that the underlines are divided at division positions between phrases in the output image.

The above-described operation is realized by, when performing the output formatting shown in FIG. 30, operating a highlighting unit (1) 5B-5 (shown in FIG. 29) as well as an image generation unit 5B-1 (shown in FIG. 29) while storing the image of each original phrase in the output format buffer 7j in step s3.

The highlighting unit (1) 5B-5 generates an underlined image of each phrase in the temporary image buffer as described in the first example and output the underlined image to the output format buffer 7j. The beginning position on the display of the output unit 3 for the next phrase is right to the end position of the preceding phrase by the predetermined length defined as a predetermined interval between the adjacent phrases. Accordingly, a space between the adjacent phrases is not underlined on the display.

By dividing the underlines, the user can recognize each boundary between the original phrase and the corresponding translated phrase.

(EXAMPLE 5)

The machine translation apparatus according to Example 5 of the present invention includes the following elements in addition to the configuration of the machine translation apparatus of Example 1: an output unit 3 (e.g., a CRT or LCD), a position locating unit 5D (see FIG. 1; specifically, the position locating unit 5D can be composed of a cursor display unit and cursor keys included in the input unit 2 in FIG. 1, or a mouse cursor display unit and a mouse included in the input unit 2 in FIG. 1) via which a user points to a desired position on a display screen of the output unit 3, and at least one highlighting unit. In this example, it is assumed that the position locating unit 5D is composed of a cursor display unit and cursor keys. The output unit 3 displays an original sentence and a translated sentence in different regions of the display screen, as shown in FIGS. 27 and 28.

Figure 26:
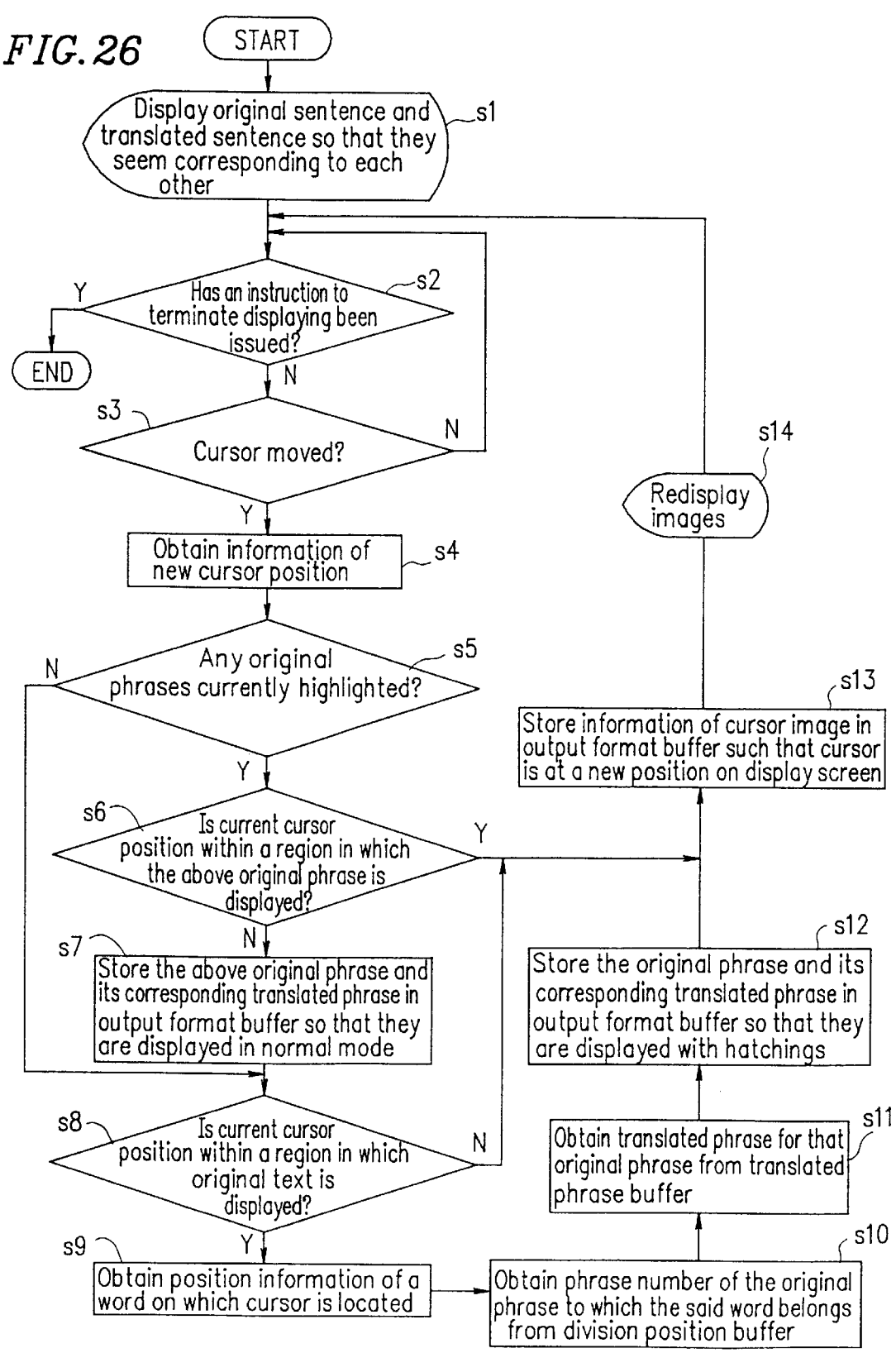
FIG. 26 is a flowchart showing the hatched display process of a machine translation apparatus according to an example of the present invention in which an original phrase on which the cursor is located and a corresponding translated phrase thereof are displayed with hatches.

Hereinafter, an operation for displaying a translation result according to the present example will be described with reference to the flowchart in FIG. 26. The translation is already completed at the point indicated as "start" in FIG. 26. A display image, which was built by an output formatting unit 5B, is already stored in an output format buffer 7j.

In step s1, the image stored in the output formatting unit 5B is displayed by the display unit 3, as exemplified in FIG. 27. In FIG. 27, the cursor is at the first letter of the first phrase "In addition to sequential" of the original sentence. As a result, the entire first phrase (in the original sentence) is highlighted by the highlighting unit (2) 5B-6 in FIG. 29, and the first phrase "chikuji fairu ni kuwaete" in the corresponding translated sentence is also highlighted by the highlighting unit (2) 5B-6.

In this example, the highlight display can be realized, for example, by "inverting" the characters or by drawing an underline. The "inverted" characters are, for example, displayed in black on a white background, while the ordinary characters which are not highlighted are displayed in white on a black background. In this example, the inversion is used to highlight characters. This inversion display is illustrated by hatching in FIGS. 27 and 28.

After step s1, the machine translation apparatus enters a state where it waits for any input by the user. If an instruction to terminate the displaying has been issued by the user when the control is at step s2, the displaying is terminated; if not, the control proceeds to step s3. If an instruction to move the cursor is issued (as realized by the user operating on the cursor keys), the control proceeds to step s4; if not, the control returns to step s2. In other words, if the user performs no operation at this time, the control continues in a loop between steps s2 and s3.

If the user manipulates the cursor keys so as to move the cursor one line down, the control proceeds from step s3 to s4, where the output formatting unit 5B acquires information of a new position of the cursor. Herein, it is assumed that the new cursor position is at the first letter "s" of the word "second" in the second phrase "the second file structure" of the original sentence.

Then, the control proceeds to step s5, where it is determined whether or not any original phrase is currently highlighted. Since the phrase "In addition to sequential files," is currently highlighted, the control proceeds to step s6, where it is determined whether or not the current cursor position is within the above-mentioned highlighted region. Since the current cursor position is outside the phrase "In addition to sequential files,", the control proceeds from step s6 to step s7.

If the user issues an instruction to move the cursor to a position which is within a currently inverted original phrase in step s3, the control proceeds from step s6 to step s13.

In step s7, in order to switch the display mode of the currently inverted original phrase and its corresponding translated phrase into an ordinary display mode, the data of any highlighted original phrases in the data stored in the output format buffer 7j is updated to normal display data. Herein "In addition to sequential files," and "chikuji fairu ni kuwaete" are switched to normal display (i.e., as opposed to highlighted display).

The control proceeds to step s8, where it is determined whether or not the current cursor position is within the region in which the original sentence (i.e., any original phrases) is displayed. Since the current cursor position is within "the second file structure", the control proceeds from step s8 to step s9.

In steps s9 to s11, it is determined which original phrase and translated phrase are to be newly highlighted. In step s9, the position information of a word on which the cursor is currently located is obtained. Herein, the cursor is located on the word "second", whose position value is 7 (as found in the original text buffer 7a in FIG. 4).

In step s10, the number of the original phrase to which the above word belongs is obtained. Herein, as indicated by the content of the division position buffer 7g (shown in FIG. 11), the above word having a word position value of 7 belongs to the second phrase "the second file structure". Next, in step s11, a translated phrase corresponding to this original phrase is obtained. By referring to the translated phrase buffer (in FIG. 13), it is revealed that the translated phrase "dai2 no fairu ha" corresponds to the second original phrase. Thus, it is decided that the original phrase "the second file structure" and its translated phrase "dai2 no fairu ha" are determined are to be newly highlighted.

In step s12, the highlighting unit (2) 5B-6 is employed so as to highlight the above-mentioned phrases ("the second file structure" and its translated phrase "dai2 no fairu ha"), which are to be newly highlighted. An output image is accordingly stored in the output format buffer 7j. In step s13, an output image is stored in the output format buffer 7j such that the cursor is displayed at a new position.

In step 14, the output image stored in the output format buffer 7j is displayed by the display unit 3 again. As a result, as shown in FIG. 28, the original phrase "the second file structure" and its corresponding translated phrase "dai2 no fairu ha" are displayed so as to be somehow highlighted, with the cursor being located at the first letter "s" of the word "second".

Although the operation program module 5 was described to be implemented as a software program in the above Examples, it is not limited thereto. For example, the operation program module 5 can be implemented as a piece of hardware (e.g., an application specific integrated circuit employing wired logic or programmed logic) performing the function of the program.

Thus, the machine translation apparatus according to the present invention outputs a translation result in a phrase-by-phrase (by the academic sense) or clause-by-clause manner, etc., which is a finer segmentation than by sentences. Therefore, the machine translation apparatus is especially suitable in the case where a user edits the output result thereof (i.e., so called "post edition").

In addition, the machine translation apparatus of the present invention utilizes sentence-by-sentence analysis results. This makes the information of correlation (i.e., relationship as to which word refers to which word) available, for example, so that proper translated words can be selected with a higher accuracy as compared with the accuracy provided by a machine translation apparatus which performs a phrase-by-phrase (in the academic sense) or clause-by-clause syntax analysis only. Even if the sentence-by-sentence analysis according to the present invention results in an error, this error is highly likely to be eliminated by dividing the sentence into phrases. In other words, the machine translation apparatus of the present invention combines the advantages of sentence-based analysis and the advantages of analysis based on smaller portions of the sentence.

Moreover, the grammatical rules according to the present invention are not categorized into those for phrase-by-phrase processes and those for sentence-by-sentence processes, etc. Thus, a designer of the rules for the machine translation apparatus is freed from the burden of having to create such complicated systems of grammatical rules. The designer, as long as he/she can obtain the syntax analysis results, can adjust division rules independently of the grammatical rules, thereby describing the division rules with less constraints.

Furthermore, rules for determining division positions (at which a sentence is divided into phrases) can be categorized into groups, depending on the different levels assigned thereto, so that the user of the apparatus can adjust the level of particular phrase division rules to be applied to the operation. This enables the user to adjust the tendency of the lengths of the output phrases to be generally long or generally short.

Moreover, in the case where the phrase-by-phrase output of translation creates difficulty in comprehending the translation, auxiliary symbols such as "~" (an omission symbol) can be inserted in the output translated phrases as necessary, thereby eliminating the problem.

Moreover, owing to the function of an output formatting unit, a machine translation apparatus according to the present invention can output the translation result in such a manner that the beginning of each original phrase and the beginning of its corresponding translated phrase are aligned with each other, irrespective of the difference in length between the original and translated phrases. As a result, the correspondence or relationship between the original phrase and the translated phrase can be clarified so as to be easily grasped by the user.

Moreover, an underline can be drawn along each original phrase in the output image, such that the underlines are also divided at divisions between phrases. Thus, it can be further facilitated to grasp the correspondence or relationship between the original phrase and the translated phrase.

Moreover, when displaying a translation result on the display screen, a given original phrase and its corresponding translated phrase can be displayed in a highlighted mode (e.g., inversion of characters) while displaying the other phrases in an ordinary display mode, such highlighted phrases being selectable by the user via input means such as cursor keys. Thus, it can be further facilitated to grasp the correspondence or relationship between the original phrase and the translated phrase.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A machine translation apparatus for translating a source language sentence into a target language sentence, the apparatus comprising:

an analysis unit for analyzing the source language sentence and generating a syntax tree of the source language;

a conversion unit for converting the syntax tree of the source language into a syntax tree of the target language;

a generation unit for generating the target language sentence based on the syntax tree of the target language;

a correspondence information storage unit for storing information of correspondence between words in the source language sentence and words in the target language sentence obtained by the generation unit;

a positioning unit for determining division positions at which to divide the source language sentence into phrases in the source language sentence based on phrase categories in the syntax tree of the source language generated by the analysis unit, a translated phrase building unit for dividing the source language sentence at the division positions and generating phrases in the target language sentence corresponding to the phrases in the source language sentence;

an output formatting unit for generating an output format for displaying the phrases in the source language sentence so that the phrases in the source language sentence correspond to the phrases in the target language sentence; and a display unit for outputting the phrases in the source language sentence and the phrases in the target language sentence onto a display screen.

2. The machine translation apparatus according to claim 1, further comprising a unit for setting a division level for determining general lengths of the phrases in the source language sentence, the positioning unit determining the division positions at which to divide the source language sentence into the phrases in accordance with the division level.

3. The machine translation apparatus according to claim 2, wherein the positioning unit includes a division position storage unit for storing information as to whether or not to generate an auxiliary symbol in cases where a division is made in the source language sentence between a phrase and another phrase to which the phrase refers to, the translated phrase building unit inserting the auxiliary symbol into a phrase in the target language sentence in accordance with the information stored in the division position storage unit.

4. The machine translation apparatus according to claim 2, wherein the output formatting unit includes:

a phrase beginning position determination unit for determining a beginning position of a phrase in the source language sentence on the display screen;

a phrase length acquisition unit for determining lengths of the phrase in the source language sentence and the corresponding phrase in the target language sentence on the display screen, and a phrase end position acquisition unit for determining an end position of the corresponding phrase in the target language sentence on the display screen.

5. The machine translation apparatus according to claim 4, further comprising a border display unit which does not incorporate any highlighting at borders between adjacent phrases when displaying the phrases in the source language sentence on the display screen.

6. The machine translation apparatus according to claim 2, further comprising a border display unit which does not incorporate any highlighting at borders between adjacent phrases when displaying the phrases in the source language sentence on the display screen.

7. The machine translation apparatus according to claim 2, further comprising:

a position locating unit by which a user identifies a phrase in the source language sentence on the display screen; and a highlighting unit for displaying the phrase in the source language sentence identified by the position locating unit and a corresponding phrase in the target language sentence with a highlighting effect on the display screen so as to be distinguishable from other phrases.

8. The machine translation apparatus according to claim 1, wherein the positioning unit includes a division position storage unit for storing information as to whether or not to generate an auxiliary symbol in cases where a division is made in the source language sentence between a phrase and another phrase to which the phrase refers to, the translated phrase building unit inserting the auxiliary symbol into a phrase in the target language sentence in accordance with the information stored in the division position storage unit.

9. The machine translation apparatus according to claim 1, wherein the output formatting unit includes:

a phrase beginning position determination unit for determining a beginning position of a phrase in the source language sentence on the display screen;

a phrase length acquisition unit for determining lengths of the phrase in the source language sentence and the corresponding phrase in the target language sentence on the display screen; and a phrase end position acquisition unit for determining an end position of the corresponding phrase in the target language sentence on the display screen.

10. The machine translation apparatus according to claim 9, further comprising a border display unit which does not incorporate any highlighting at borders between adjacent phrases when displaying the phrases in the source language sentence on the display screen.

11. The machine translation apparatus according to claim 1, further comprising:

a position locating unit by which a user identifies a phrase in the source language sentence on the display screen; and a highlighting unit for displaying the phrase in the source language sentence identified by the position locating unit and a corresponding phrase in the target language sentence with a highlighting effect on the display screen so as to be distinguishable from other phrases.

12. The machine translation apparatus according to claim 1, further comprising a border display unit which does not incorporate any highlighting at borders between adjacent phrases when displaying the phrases in the source language sentence on the display screen.

13. A machine translation apparatus for translating a source language sentence into a target language sentence comprising:

a positioning unit for automatically determining division positions at which to divide the source language sentence into phrases in accordance with predefined phrase categories and predefined rules;

a translated phrase building unit for dividing the source language sentence at the division positions and generating phrases in the target language sentence corresponding to the phrases in the source language sentence; and an output unit for outputting phrases in the source language sentence and phrases in the target language sentence corresponding to the phrases in the source language sentence.

14. The machine translation apparatus according to claim 13, wherein the predefined rules have a plurality of different division levels selectable for determining general length of the phrases in the source language sentence.

15. The machine translation apparatus according to claim 13, wherein the output unit consecutively outputs a phrase in the source language sentence and a corresponding phrase in the target language sentence.

* * * * *